(12) United States Patent
Sakai et al.

(10) Patent No.: US 8,077,369 B2
(45) Date of Patent: Dec. 13, 2011

(54) OPTICAL SCANNING DEVICE, OPTICAL WRITING DEVICE, AND IMAGE FORMING APPARATUS

(75) Inventors: Kohji Sakai, Tokyo (JP); Yoshinori Hayashi, Kanagawa (JP); Takeshi Ueda, Tokyo (JP); Daisuke Ichii, Kanagawa (JP); Kenichiroh Saisho, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/152,989

(22) Filed: Jun. 3, 2011

(65) Prior Publication Data
US 2011/0228368 A1   Sep. 22, 2011

Related U.S. Application Data

(62) Division of application No. 11/740,070, filed on Apr. 25, 2007, now Pat. No. 7,973,990.

(30) Foreign Application Priority Data

| Apr. 27, 2006 | (JP) | 2006-123329 |
| Apr. 28, 2006 | (JP) | 2006-125792 |
| Jul. 28, 2006 | (JP) | 2006-206680 |

(51) Int. Cl.
    *G02B 26/08* (2006.01)
(52) U.S. Cl. ............................................. 359/205.1
(58) Field of Classification Search ............ 359/205.1, 359/206.1, 207.1, 207.2, 565, 566, 567, 568
See application file for complete search history.

(56) References Cited

U.S. PATENT DOCUMENTS

| 5,739,940 | A  | 4/1998  | Kondo |
| 6,038,053 | A  | 3/2000  | Kato |
| 6,388,792 | B1 | 5/2002  | Atsuumi et al. |
| 6,473,233 | B1 | 10/2002 | Iizuka |
| 6,822,671 | B2 | 11/2004 | Inagaki |
| 6,961,164 | B2 | 11/2005 | Atsuumi |
| 6,999,208 | B2 | 2/2006  | Suzuki et al. |

(Continued)

FOREIGN PATENT DOCUMENTS

EP   0 872 754 B1   10/1998

(Continued)

OTHER PUBLICATIONS

Office Action issued Feb. 15, 2011, in Japanese Patent Application No. 2006-123329, filed Apr. 27, 2006 (without an English language Translation).

(Continued)

*Primary Examiner* — Euncha Cherry
(74) *Attorney, Agent, or Firm* — Oblon, Spivak, McClelland, Maier & Neustadt, L.L.P.

(57) ABSTRACT

An optical scanning device includes a first optical system for guiding light beams emitted from a plurality of light emitting units to an optical deflector, and a second optical system for focusing the light beams to optically scan a surface to be scanned. At least one of the first optical system and the second optical system includes a resin lens having a diffractive surface. The diffractive surface includes a diffractive portion and a refractive portion. A power of the diffractive portion and a power of the refractive portion cancel each other.

9 Claims, 20 Drawing Sheets

U.S. PATENT DOCUMENTS

| | | |
|---|---|---|
| 7,227,690 B2 * | 6/2007 | Schilling et al. ............ 359/565 |
| 7,362,486 B2 | 4/2008 | Hayashi et al. |
| 7,417,777 B2 | 8/2008 | Saisho et al. |
| 7,663,657 B2 | 2/2010 | Ichii et al. |
| 7,672,032 B2 | 3/2010 | Hayashi et al. |
| 2004/0169905 A1 | 9/2004 | Hayashi et al. |
| 2005/0179771 A1 | 8/2005 | Ueda |
| 2005/0201219 A1 | 9/2005 | Hotsuta et al. |
| 2005/0269496 A1 | 12/2005 | Hayashi |

FOREIGN PATENT DOCUMENTS

| | | |
|---|---|---|
| JP | 09-105877 | 4/1997 |
| JP | 10-333070 | 12/1998 |
| JP | 11-223783 | 8/1999 |
| JP | 2001-324691 | 11/2001 |
| JP | 2002-287062 | 10/2002 |
| JP | 3483141 | 10/2003 |
| JP | 2003-337295 | 11/2003 |
| JP | 2004-126192 | 4/2004 |
| JP | 2004-280056 | 10/2004 |
| JP | 2005-227489 | 8/2005 |
| JP | 2005-258392 | 9/2005 |
| JP | 2006-035703 | 2/2006 |
| JP | 2006-071893 | 3/2006 |
| JP | 2007-249044 | 9/2007 |

OTHER PUBLICATIONS

Office Action issued Mar. 8, 2011, in Japanese Application No. 2006-125792.

U.S. Appl. No. 13/152,989, filed Jun. 3, 2011, Sakai, et al.

* cited by examiner

LD ARRAY HAVING FOUR LIGHT EMITTING POINTS

MAIN SCANNING

SUB-SCANNING

DIFFRACTION PORTION    REFRACTION PORTION

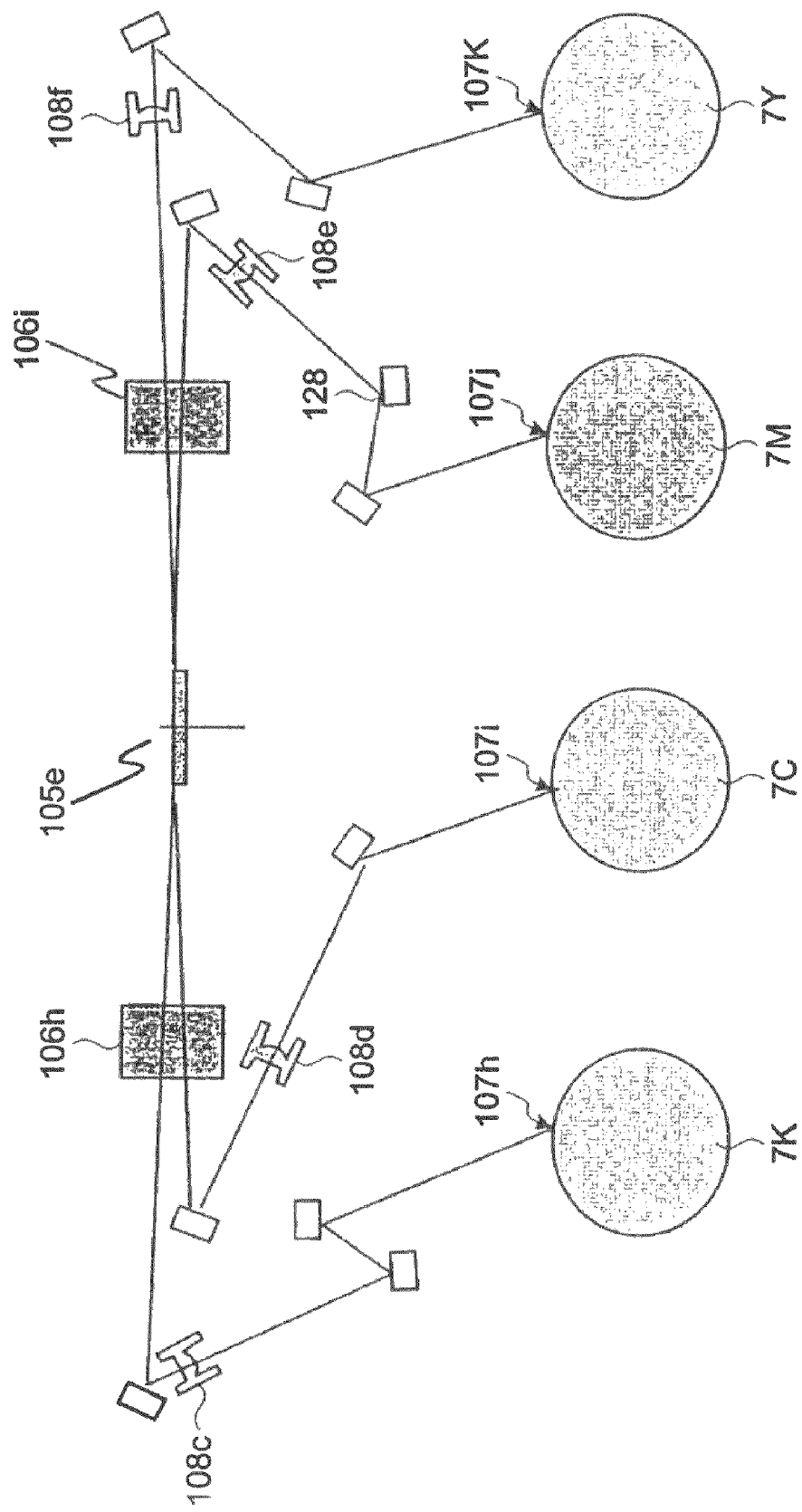

OPTICAL SCANNING DEVICE, OPTICAL WRITING DEVICE, AND IMAGE FORMING APPARATUS

CROSS-REFERENCE TO RELATED APPLICATIONS

The present document is a divisional of U.S. application Ser. No. 11/740,070 filed Apr. 25, 2007 now U.S. Pat. No. 7,973,990, and incorporates by reference the entire contents of U.S. Ser. No. 11/740,070, and Japanese priority documents, 2006-123329 filed in Japan on Apr. 27, 2006, 2006-125792 filed in Japan on Apr. 28, 2006, and 2006-206680 filed in Japan on Jul. 28, 2006.

BACKGROUND OF THE INVENTION

1. Field of the Invention

The present invention relates to an optical scanning device, an optical writing device, and an image forming apparatus.

2. Description of the Related Art

An image forming apparatus such as a digital copier and a laser printer forms a latent image by radiating a light beam to a photosensitive element, which is an image carrier, using an optical scanning device. Recently, high-density image formation through optical scanning is developing, and a smaller beam-spot diameter on the photosensitive element is demanded of the image forming apparatus.

In addition to the high density, high-speed image formation is progressing, and an optical scanning device meeting these requirements is demanded. As a means of increasing the speed and the density, there is a means of causing a polygon mirror as a deflecting unit to rotate at high speed. The means, however, has some problems such as increase in power consumption and noise, heat generation, and degradation of its durability.

As for the optical scanning device, it is desirable to promote resin lenses to target cost reduction.

The resin lenses, however, have large fluctuations of a surface curvature, a thickness, and a refractive index of lenses due to change in environmental temperature, and also have large changes in the refractive index due to change in wavelength of a semiconductor laser being a light source, as compared with those of glass lenses. The resin lenses are therefore largely affected by these changes.

The glass lenses also have fluctuations of a surface curvature, a thickness, and a refractive index of lenses due to change in environmental temperature, and also have change in a focus position caused by changes in the refractive index due to the change in wavelength of a semiconductor laser which is a light source. A spot diameter thereby increases, which causes image degradation.

There are various kinds of proposals to solve these problems.

For example, Japanese Patent Application Laid-Open No. 2004-126192 proposes a technology for reducing the change in a focus position due to temperature variation by combining a diffractive surface with a refractive surface of an optical system located upstream of a deflector. In the conventional technology, however, necessary consideration is not given to the change in the focus position due to temperature of the optical system (scanning optical system) located downstream of the deflector. Moreover, there is no reference to multibeam that is a plurality of beams for scanning one photosensitive element.

Japanese Patent Application Laid-Open No. 2003-337295 and Japanese Patent Application Laid-Open No. H11-223783 propose a technology for correcting the change in the focus position caused by a scanning optical system due to temperature variation, by the change in power of a diffractive portion. However, consideration is not given to the change in arrangement of optical elements in a first optical system. Moreover, there is no reference to multibeam that is a plurality of beams for scanning a same photosensitive element.

Japanese Patent Application Laid-Open No. 2002-214556 proposes a technology for a scanning/imaging optical system, an optical scanning device, and an image forming apparatus, and a method of correcting the change in a focus position due to temperature by combining at least three lenses in an optical system located upstream of a deflector without using a diffractive surface.

Japanese Patent Application Laid-Open No. 2005-258392 proposes a technology for reducing the change in a focus position due to temperature variation by combining a diffractive surface and a refractive surface of an optical system located upstream of a deflector. Although multibeam is mentioned in this conventional technology, two diffractive surfaces are provided on the upstream of the deflector.

As a means of solving the problem, as the conventional technology described in Japanese Patent Application Laid-Open No. 2002-214556, there is the method of correcting the change in a focus position by combining at least three lenses in the optical system located upstream of the deflector. In this method, however, an increase in the number of lenses results in an increase in cost. Even in this case, a piece of glass lens is required, which also causes the increase in cost.

Japanese Patent Application Laid-Open No. H10-333070 discloses a method of correcting the change by providing a diffractive optical surface on a scanning lens. However, the scanning lens has a wide range through which a light flux passes, and requires time for machining the diffractive optical surface, which causes an increase in cost.

To solve the problems, the conventional technologies such as Japanese Patent Application Laid-Open No. 2004-126192, Japanese Patent Application Laid-Open No. 2003-337295, and Japanese Patent Application Laid-Open No. H11-223783 propose the methods of reducing the change in beam spots due to temperature variation by using the resin lens with the diffractive surface located upstream of the deflector.

The conventional technologies, however, have a problem specific to the multibeam. The problem is such that a wavelength difference between beams is not mentioned, and that even if performance of one beam can be acquired, performance of another beam cannot be acquired. For high image quality, there remains a problem of a difference in the amount of light between multibeams.

There is known an optical scanning device (laser scanning device) described in Japanese Patent Application Laid-Open No. 2002-287062. The optical scanning device employs a diffractive surface to make its optical property stable, allowing for the change in the optical property due to the temperature variation and for the wavelength change in a light source.

The optical scanning device disclosed in Japanese Patent Application Laid-Open No. 2002-287062 is such that a light-source optical system is configured with one resin-made optical element. More specifically, the light-source optical system causes a laser light emitted from a laser light source to be a parallel light in a main scanning direction and causes the laser light to be collected near a deflection/reflection facet of an optical deflector in a sub-scanning direction. The optical element has one or more reflection surfaces having no rotationally symmetric axis and also has two transmission surfaces, and provides a diffractive surface in each transmission surface. This patent application also discloses, as a comparative example, an optical scanning device in which a diffractive surface is provided in each of a resin-made collimator lens for collimating a light beam emitted from a semiconductor laser and of a resin-made cylinder lens for focusing the collimated light beam in the sub-scanning direction. The "diffractive surface" has a lens power due to diffraction.

The light-source optical system disclosed in Japanese Patent Application Laid-Open No. 2002-287062 has to form the transmission surface and the reflection surface in one optical element, and includes a curved reflection surface. Therefore, the light-source optical system is not always easy to be manufactured, and thus, there is room for improvement in terms of cost reduction of the optical scanning device.

Furthermore, the diffractive surface generally requires micromachining technology, and also requires extremely high precision. For example, the diffractive surface having power and a focal length f equivalent to those of a spherical lens as shown in FIG. 23A is in a shape as shown in FIG. 23B. This is a shape formed so that the height of the spherical surface is made even with respect to a substrate. As is clear from FIG. 23B, the diffractive surface has grooves whose pitches are becoming narrower with distance from the optical axis, which causes machining to become exponentially difficult. Furthermore, any diffractive surface sandwiched by back cuts needs to be part of the spherical surface. Although the part of the spherical surface can be approximated as a straight line, diffraction efficiency inevitably decreases in this case. However, if the diffractive surface is formed so as to be part of the spherical surface, roughness of its surface shape becomes noticeable, which causes degradation of wavefront aberration, and the beam-spot diameter thereby increases. And, occurrence of scattered light causes ghost to occur and transmission efficiency of light to decrease.

SUMMARY OF THE INVENTION

It is an object of the present invention to at least partially solve the problems in the conventional technology.

According to an aspect of the present invention, an optical scanning device includes a first optical system that guides light beams emitted from a plurality of light emitting units to an optical deflector, and a second optical system that focuses light beams deflected by the optical deflector on a target surface to be scanned to form a light spot and optically scans the target surface with the light spot. At least one of the first optical system and the second optical system includes a resin lens having a diffractive surface. The diffractive surface includes a diffractive portion and a refractive portion, and is in a shape so that a power of the diffractive portion and a power of the refractive portion cancel each other.

According to another aspect of the present invention, an optical scanning device includes a semiconductor laser that includes a plurality of light sources, a deflecting unit that deflects light beams emitted from the light sources, a first optical system that guides the light beams to the deflecting unit, and a second optical system that guides the light beams from the deflecting unit to a target surface to be scanned. The first optical system has a diffractive surface where the light beams pass through.

According to still another aspect of the present invention, an optical scanning device includes a first optical system that shapes a plurality of light fluxes emitted from a light source unit and guides the light fluxes to an optical deflector, and a second optical system that guides the light fluxes deflected by the optical deflector to a surface to be scanned to form an image on the surface. The first optical system includes a linear-image forming lens made of resin, which has a function of focusing the light fluxes in a sub-scanning direction and is an optical element having a power, and an optical element having no power. The linear-image forming lens has a diffractive surface.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 22 is a schematic cross section of a tandem-type engine including an optical writing device according to a fifth embodiment of the present invention;

DETAILED DESCRIPTION OF THE PREFERRED EMBODIMENTS

Exemplary embodiments of the present invention are explained in detail below with reference to the accompanying drawings.

Figure 1:
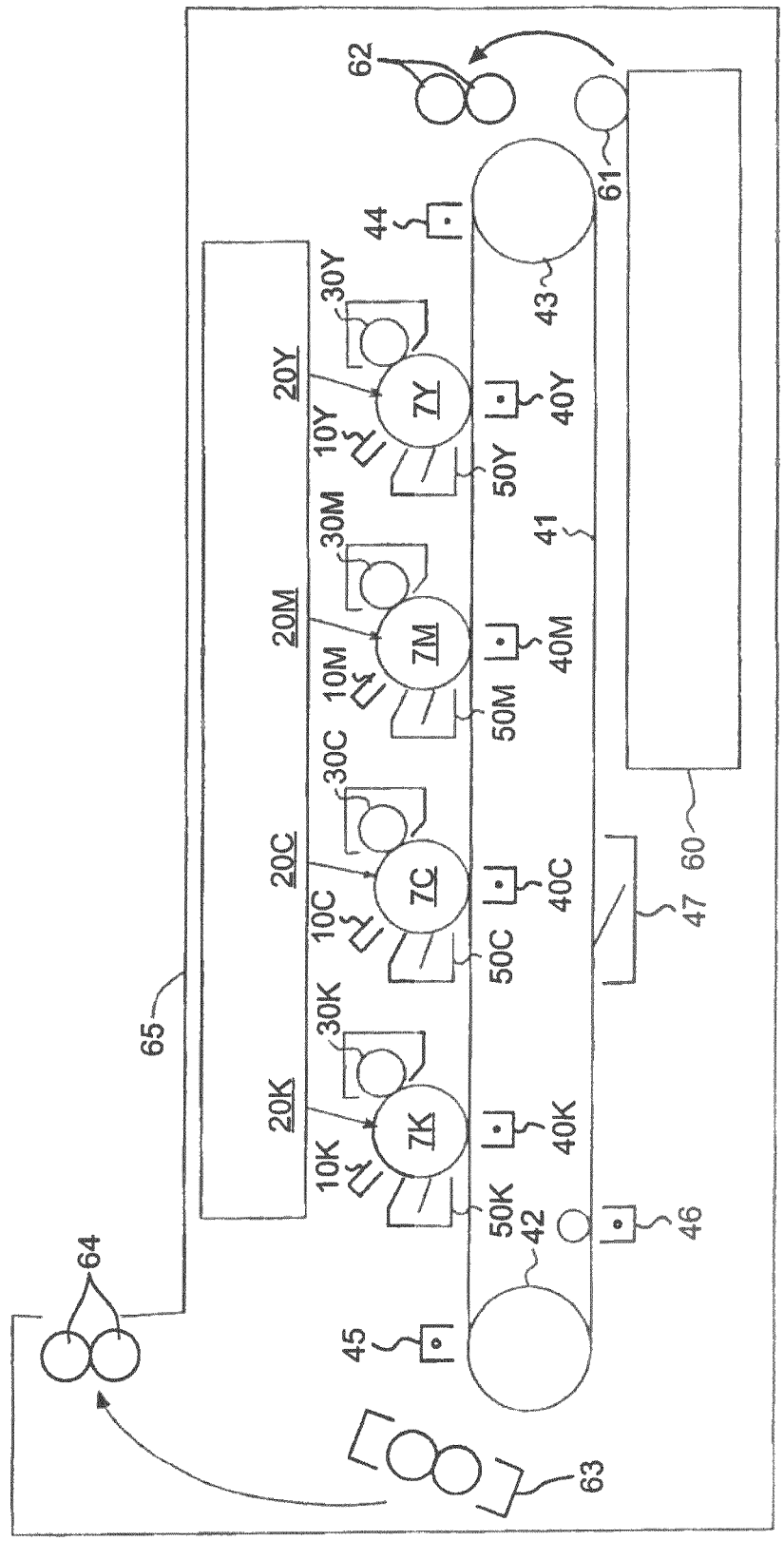
FIG. 1 is an example of an image forming apparatus.

FIG. 1 is an example of an image forming apparatus that employs any one of optical scanning devices according to first to fifth embodiments of the present invention. The image forming apparatus is a tandem-type full-color optical printer. In the first to the fifth embodiments, the optical scanning device is applied to, for example, the full-color optical printer; however, the optical scanning device can also be applied to other image forming apparatuses such as a monochrome printer.

A conveyor belt 41 is provided in the lower side of the image forming apparatus. The conveyor belt 41 conveys a transfer paper (not shown) fed from a paper feed cassette 60 arranged in a horizontal direction of FIG. 1. The conveyor belt 41 is stretched and supported by a plurality of rollers 42 and 43. Arranged along the conveyor belt 41 are a photosensitive element 7Y for yellow (Y), a photosensitive element 7M for magenta (M), a photosensitive element 7C for cyan (C), and a photosensitive element 7K for black (K), which are image carriers. These photosensitive elements are equally spaced in this order from the upstream side of the conveying direction. In the following, Y, M, C, and K in signs indicate yellow, magenta, cyan, and black, respectively.

All the photosensitive elements 7Y, 7M, 7C, and 7K are formed with the same diameter as one another, and process elements for image forming are sequentially arranged around each of the photosensitive elements according to an electrophotographic process. Sequentially arranged around the photosensitive element 7Y for yellow, for example, are an electrifying charger 10Y, an optical scanning device 20Y, a developing device 30Y, a transfer charger 40Y, and a cleaning device 50Y. The same goes for the other photosensitive elements 7M, 7C, and 7K.

In other words, the image forming apparatus includes the photosensitive elements 7Y, 7M, 7C, and 7K which are surfaces to be scanned set for the colors, respectively, and the optical scanning devices 20Y, 20M, 20C, and 20K are arranged in a one-to-one correspondence with the respective photosensitive elements 7Y, 7M, 7C, and 7K.

Figure 2:
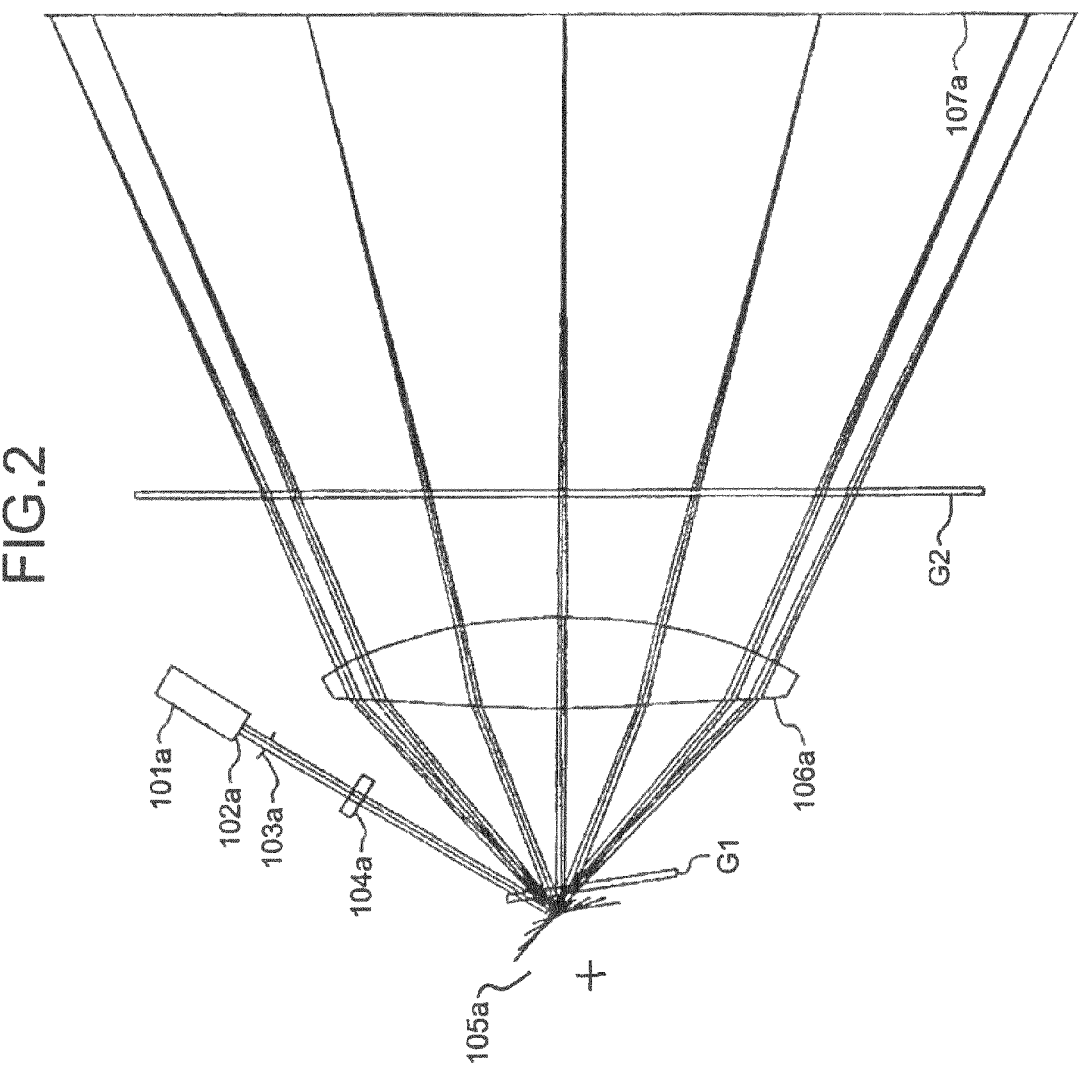
FIG. 2 is a schematic diagram of an optical system in an optical scanning device shown in FIG. 1.

These optical scanning devices can be used in various ways such that an optical scanning device having an optical arrangement as shown in FIG. 2 can be independently used. Alternatively, as is conventionally known, a device proposed by Japanese Patent Application Laid-Open No. 2004-280056 shares an optical deflector (rotating polygon mirror), and one of lenses as scanning optical systems in the optical scanning devices can be shared for optical scanning of the photosensitive elements 7M and 7Y, and another one can also be shared for optical scanning of the photosensitive elements 7K and 7C.

Arranged around the conveyor belt 41 are registration rollers 62 and a belt electrifying charger 44, which are located on the upstream side of the photosensitive element 7Y. Arranged around the conveyor belt 41 are also a belt separating charger 45, a decharger 46, a belt cleaning device 47, or the like, which are located on the downstream side of the photosensitive element 7K. A fixing device 63 is arranged on the downstream side of the belt separating charger 45 in the conveying direction, and is connected to a paper discharge tray 65 through paper discharge rollers 64.

In the image forming apparatus configured as above, in a full color mode, for example, the optical scanning devices 20Y, 20M, 20C, and 20K optically scan the photosensitive elements 7Y, 7M, 7C, and 7K based on image signals for the colors Y, M, C, and K, and form electrostatic latent images for the colors thereon respectively. The electrostatic latent images are developed with toners of the colors in the corresponding developing devices 30Y, 30M, 30C, and 30K, and toner images are thus obtained respectively.

Meanwhile a transfer paper is conveyed from the paper feed cassette by the rotation of a paper feed roller 61, passes through the registration rollers 62, and reaches the conveyor belt 41. Thereafter, the transfer paper is electrostatically attracted to and conveyed on the conveyor belt 41, and the toner images are sequentially transferred on the transfer paper so as to be superposed on each other. The four-color toner images superposedly transferred on the transfer paper are fixed as a full color image by the fixing device 63, and the transfer paper with the fixed images thereon is discharged onto the paper discharge tray 65 by the paper discharge rollers 64.

The optical scanning device according to the first embodiment explained later is used for the image forming apparatus having the configuration and operations, and it is thereby possible to obtain a stable beam-spot diameter at any time and implement a compact and low-cost image forming apparatus suitable for high-resolution printing.

The configuration, operation, and functional effect of the optical scanning device according to the first embodiment are explained in detail below.

The optical scanning device according to the first embodiment includes a first optical system for guiding light beams emitted from a plurality of light emitting units to an optical deflector, and a second optical system for collecting the light beams deflected by the optical deflector onto the surface to be scanned to form a light spot and for optically scanning the surface to be scanned. The optical scanning device has characteristics as follows.

More specifically, at least one of the first optical system and the second optical system includes a resin lens. At least one of the resin lenses has a diffractive surface, and at least one surface shape of the diffractive surface is set so that the power of its diffractive portion and the power of its refractive portion cancel each other.

The surface shape of the diffractive surface preferably has a step structure and almost no power. The diffractive surface is set so that the change in a beam waist position in the main scanning direction and/or the sub-scanning direction caused by temperature change in the semiconductor laser is made "almost zero". As explained above, the diffractive surface has a diffraction function equivalent to a lens function.

The optical scanning device configured as above employs the diffractive surface for the first optical system, which enables to form a linearly symmetric step structure.

The optical scanning device is preferably configured so that the first optical system is a lens having no power in the main scanning direction and having a positive power in the sub-scanning direction.

The optical scanning device is also preferably configured so that the first optical system has a diffractive surface on the side of its exit surface.

In the optical scanning device configured as above, it is preferable that the first optical system can be adjusted along the optical axis direction. In this case, an optical element for coupling explained later converts the light beam from the semiconductor laser to a light beam in a desired beam form. The function in this case is preferably a collimating function. Furthermore, the first optical system is preferably set so as not to have a power in the main scanning direction. By obtaining the first optical system so as not to have a power in the main scanning direction, even if a machining error and an assembly error occur upon initial assembly of the optical system, the change in a beam waist position in the sub-scanning direction can be adjusted without any effect on the optical property in the main scanning direction by shifting the first optical system in the optical axis direction.

Therefore, fluctuations of the power occurring in the machining error can be absorbed by the adjustment without requiring high-level shape precision of the diffractive surface used for the first optical system. Particularly, if the adjustment can be provided without any effect on the optical property in the main scanning direction, the fluctuations in the main scanning direction can be independently adjusted by the optical element for coupling, and those in the sub-scanning direction can be independently adjusted by the first optical system. Thus, the adjusting work is made significantly simple.

Note that the power of the first optical system is a power obtained by combining the power due to the refractive surface and the power due to the diffractive surface.

The optical scanning device can further be configured so as to perform a single-beam scanning method using one ordinary semiconductor laser that is used as a light source for a plurality of light emitting units. Alternatively, it can be configured so as to execute a multibeam scanning method by using a semiconductor laser array or two or more semiconductor lasers.

If the semiconductor laser array is used for the light emitting units, a coupling lens as an optical element for coupling provided for the semiconductor laser array is preferably made of glass.

On the other hand, if the two or more semiconductor lasers are used for the light emitting units, a coupling lens as an optical element for coupling provided for each of the semiconductor lasers can be made of resin and has a diffractive surface. In this case, at least one surface of the coupling lens preferably has a diffractive surface.

In the optical scanning device, the diffractive surface can be made as a rotationally symmetric step structure. In this case, it is preferable that the optical element for coupling has the diffractive surface on the side of its entrance surface. Moreover, the optical scanning device is preferably configured so that the surface opposite to the diffractive surface of the optical element for coupling is made as a rotationally symmetric aspherical surface.

The image forming apparatus according to the first embodiment is such that an optical scanning unit optically scans a photosensitive image carrier to form a latent image thereon and a developing unit visualizes the latent image to obtain an image. The image forming apparatus uses the optical scanning device configured as above, as an optical scanning unit that optically scans the image carrier.

Furthermore, the image forming apparatus according to the first embodiment includes one or more imaging units each in which an optical scanning unit optically scans a photosensitive image carrier to form a latent image thereon and a developing unit visualizes the latent image to obtain an image. The image forming apparatus uses one or more optical scanning devices configured as above, as the optical scanning unit that optically scans the image carrier.

The image forming apparatus can be configured so that by providing one or more imaging units, a monochrome image can be formed using one imaging unit, and by providing two or more imaging units, a color image such as a two-color image and a multicolor image can be formed. In this case, the optical scanning devices for performing optical scanning in the imaging units may be discretely provided for each imaging unit, or part of optical elements such as part of an optical deflector and a scanning optical system may be shared by a plurality of scanning optical systems, as is known by Japanese Patent Application Laid-Open No. 2004-280056.

If two or more imaging units are provided, the two or more imaging units can be arranged at different positions with respect to one image carrier, or individual imaging units can also be arranged at respective positions corresponding to image carriers which are arranged along the conveying direction of a transfer material or of an intermediate transfer element like a so-called tandem-type color image forming apparatus.

Brief consideration is given to how the beam waist position of a light beam collected onto the surface to be scanned changes caused by environmental variation and wavelength change when the resin lens is included in the optical system for the optical scanning device.

The change in the beam waist position due to temperature variation can be caused by change in refractive index itself of the resin lens due to temperature variation, change in the shape of the resin lens, and change in the refractive index (chromatic aberration) of the resin lens due to wavelength change in the semiconductor laser.

The refractive index itself of the resin lens decreases due to low density caused by expansion due to an increase in temperature. As for the shape of the resin lens, the curvature of the lens surface decreases caused by expansion due to an increase in temperature.

The light emission wavelength of the semiconductor laser generally shifts to the long wavelength side due to an increase in temperature. If the wavelength shifts to the long wavelength side, the refractive index of the resin lens generally shifts to the side where it decreases.

More specifically, the resin lens changes so that an absolute value of the power decreases due to the increase in temperature regardless of whether the resin lens is a positive lens or a negative lens.

On the other hand, referring to the power due to the diffractive portion of the diffractive surface, because a diffraction angle is proportional to the wavelength, the absolute value of the power tends to be greater if the wavelength becomes longer regardless of whether it is positive or negative.

Therefore, if the combined power of the resin lens in the optical system for the optical scanning device is positive (or negative), by setting the power of the diffractive portion to be positive (or negative), the change in the power due to temperature variation in the resin lens can be cancelled by the change in the power due to temperature variation in the diffractive portion.

The reason why "diffractive portion" of the diffractive surface is referred to herein to mention the power is because the diffractive surface of the anamorphic optical element according to the first embodiment is not always formed into a plane but is formed on a spherical surface or on a cylindrical surface. Consequently, there is also a power in a portion corresponding to a substrate where the diffractive surface is formed. Therefore, the power of the diffractive portion of the diffractive surface called in this specification indicates the power only of the diffractive surface excluding the power of the portion corresponding to the substrate.

To be more specifically explained, a consideration is given to a case where environmental temperature increases if both the power of the resin lens included in the optical system and the power of the diffractive portion of the diffractive surface are positive. Let A be a change in beam waist position due to change in the refractive index of the resin lens, B be a change in beam waist position due to change in the shape of the resin lens, C be a change in beam waist position due to change in the refractive index of the resin lens caused by change in the light emission wavelength of the semiconductor laser, and D be a change in beam waist position due to change in the power of the diffractive portion caused by change in the light emission wavelength of the semiconductor laser, then A>0, B>0, and C>0, but D<0 (the change in the direction away from the optical deflector is set to be positive).

The total change in the beam waist position due to the temperature variation is A+B+C−D. A to C are determined when the optical system including the resin lens is set. Therefore, if the power of the diffractive portion is set so as to satisfy A+B+C−D=0, which is a condition under which the change in beam waist position is 0, then the change in beam waist position due to the temperature variation can be satisfactorily corrected.

As explained above, the change in the light emission wavelength of the semiconductor laser, which is the light source, is not only caused by the temperature variation but also by the wavelength change due to mode hopping. The change in the light emission wavelength due to the mode hopping is caused by a microscopic physical phenomenon, and the cause makes it extremely difficult to predict the change.

The change in the light emission wavelength due to the mode hopping has nothing to do with temperature variation. If the light emission wavelength is changed caused by the mode hopping when there is no temperature variation from reference temperature, because A and B are 0, the change in the beam waist position becomes C−D<0, and the change cannot be corrected, and thus, the beam waist position largely changes.

When the diffractive surface is used in the optical scanning device in the above manner, it is necessary to correct the change in the beam waist position due to the temperature variation and also to reduce the change in the beam waist position due to the change in the light emission wavelength caused by the mode hopping. If not, it is impossible to obtain a stable beam-spot diameter at any time.

To correct the change in the beam waist position due to the temperature variation and also to reduce the change in the beam waist position due to the change in the light emission wavelength caused by the mode hopping, it is necessary to appropriately set the power provided to the diffractive portion. If the power provided to the diffractive portion is too large, the change in the beam waist position due to the change in the light emission wavelength caused by the mode hopping is increased.

To solve the problems, the optical scanning device according to the first embodiment is configured to set the power of the diffractive portion of the diffractive surface for the optical element so that the change in the beam waist position in the main scanning direction and/or the sub-scanning direction is made "almost zero". Specifically, the change is caused by the mode hopping and the temperature variation in the semiconductor laser.

The diffractive surface whose power is set in the above manner can generally be formed into various shapes. As explained above, however, the technology of micromachining is required to form the diffractive surface, and required precision of the micromachining is extremely high. If the precision cannot be ensured, this causes occurrence of wide-ranging undesired phenomena such as reduction in diffraction efficiency, degradation in wavefront aberration, and occurrence of scattered light. To ensure the precision, the excellent measurement technology is inevitably required. The fact is, however, that the high-quality diffractive surface cannot be obtained because it is difficult to measure even the diffractive surface whose spherical surface has a basic shape.

Therefore, the most significant characteristic of the diffractive surface in the optical element according to the first embodiment is that the diffractive surface has the step structure and almost no power. To form the step structure, the power of the diffractive portion and the power of the refractive portion are simply set so that their absolute values are equal to each other but their signs are opposite to each other. The diffractive surface obtained at this time consequently becomes the step structure. With this structure, the diffractive surface and the back cut form an almost right angle at any portion, and thus, the measurement becomes easy and the machining is very easy.

Furthermore, because the obtained diffractive surface has no power, even if there is an eccentricity between the surface and the surface on the opposite side, the effects by the eccentricity are extremely small, and thus, the request for machining precision can also be suppressed. If the step structure is provided, a formation method like a shaper machining can be employed so as not to produce a machining trace, and a machining time can also be reduced. The reduction of the machining time produces a secondary benefit such as reduction in heat generation upon machining, which is preferable to obtain a high-precision diffractive surface.

The power of the lens itself is given as a combination of the power of its entrance surface and the power of its exit surface. Even if one surface has no power, by appropriately setting the power of the opposite side, a desired lens power can be obtained. Therefore, the diffractive surface having the step structure can be adopted for lenses with any power.

The diffractive surface can be finished highly smoothly because there is no nonplanar portion even locally, and thus, there is almost no scattered light nor beam spot of large diameter.

Furthermore, when the diffractive surface with the step structure is applied to the optical scanning device using a multibeam light source, there are advantages that fluctuations of a scanning line pitch on the surface to be scanned, due to a rotation of the optical element in the optical axis direction, hardly occur.

FIG. 2 is a schematic diagram of an optical system in the optical scanning device according to the first embodiment, and represents an arrangement example of the optical system. The optical system includes a light source unit 101a, a coupling lens 102a integrally incorporated in the light source unit 101a, an aperture 103a, an anamorphic lens 104a as a first optical system, a polygon mirror (rotating polygon mirror) 105a of a polygon scanner which is an optical deflector, a scanning lens 106a as a second optical system, and a surface 107a to be scanned. The optical system also includes a soundproof glass G1 for covering a window of a soundproof housing (not shown) that accommodates therein the polygon mirror 105a, and a dustproof glass G2 provided at a light emission side of a deflected beam of a housing that accommodates therein the optical system of FIG. 2.

A plurality of light emitting units (e.g., semiconductor laser array or a plurality of semiconductor lasers) is provided in the light source unit 101a, and divergent light beams emitted from the light emitting units are converted to those in a desired form by the coupling lens 102a, and the converted light beams are shaped by the aperture 103a and enter the anamorphic lens 104a. The light beams pass through the anamorphic lens 104a and pass through the soundproof glass G1 while focusing in the sub-scanning direction, to form an image as a linear image elongated in the main scanning direction near the deflection/reflection facet of the polygon mirror 105a. The light beams reflected on the deflection/reflection facet pass through the soundproof glass G1 to enter the scanning lens 106a.

The scanning lens 106a is formed with one lens, and the light beams pass through the scanning lens 106a and enter the surface 107a through the dustproof glass G2, to form a light spot on the surface 107a by the function of the scanning lens 106a.

When the polygon mirror 105a is made to rotate at a constant speed, the light beams reflected by the deflection/reflection facet are deflected at an equiangular speed. The scanning lens 106a has fθ property in which the light spot with the light beams entering while being deflected at the equiangular speed is caused to shift at a constant speed along the main scanning direction (horizontal direction in FIG. 2) on the surface 107a, and the light spot optically scans the surface 107a at the constant speed.

The scanning lens 106a is an anamorphic optical element, to achieve a geometrical-optical conjugate relationship between the position of the deflection/reflection facet of the polygon mirror 105a and the position of the surface to be scanned in the sub-scanning direction. With this feature, the scanning lens 106a compensates for facet tilt of the polygon mirror 105a. The surface 107a is substantially a photosensitive surface of the image carrier formed of a photosensitive medium.

The detailed structure of the light source unit 101a is explained below. The light source unit 101a is a multibeam light source, and can use a semiconductor laser array having a plurality of light emitting points in one package or can use a combination of a plurality of ordinary semiconductor lasers each having one light emitting point in one package.

Figure 3:
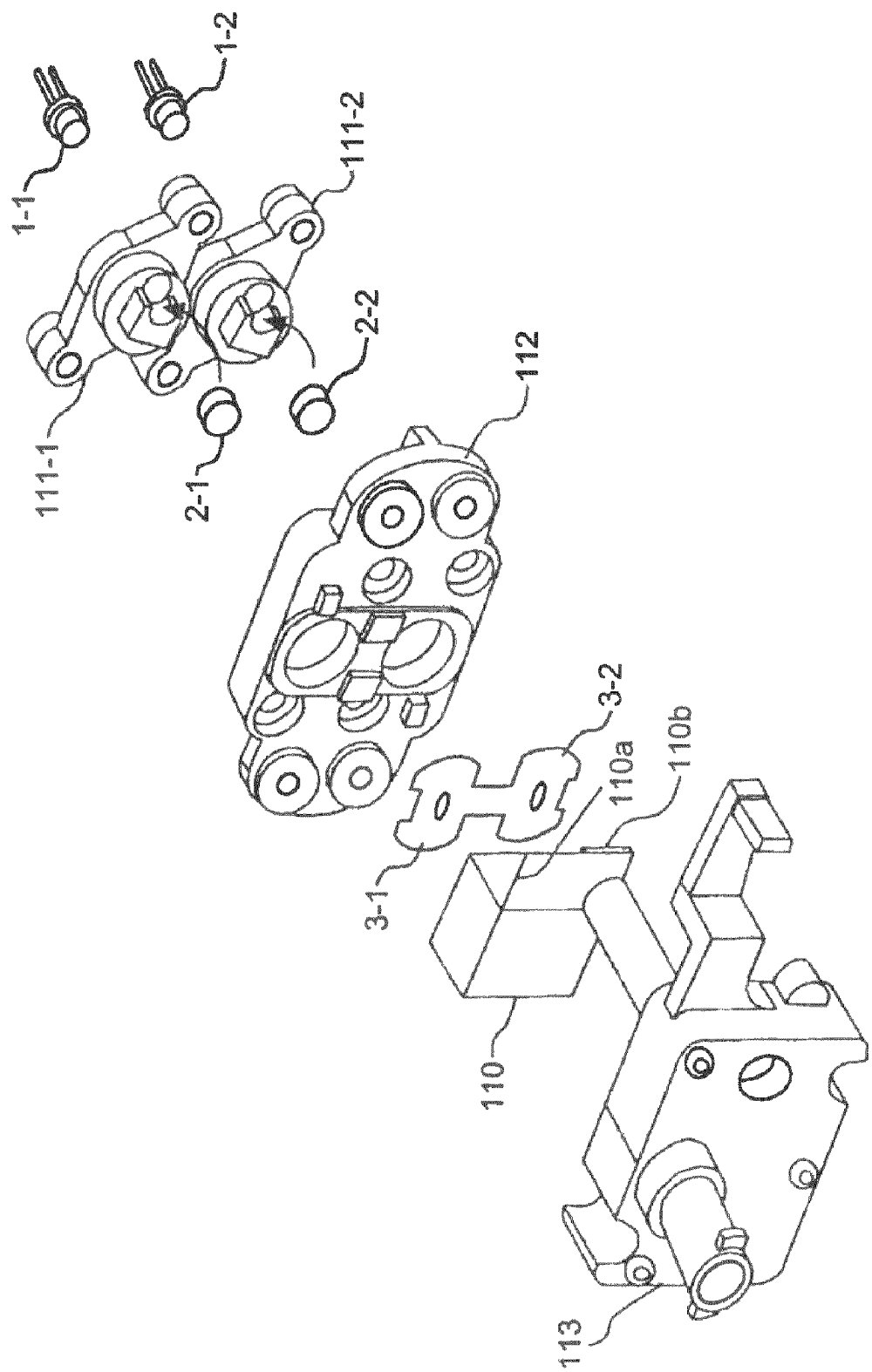
FIG. 3 is an example of components of a light source unit in the optical scanning device.

FIG. 3 is an example of components of the light source unit including a combination of ordinary semiconductor lasers. More specifically, light sources 1-1 and 1-2 are semiconductor lasers, each of which has a single light emitting point. Beams emitted from the respective light sources 1-1 and 1-2 are coupled by coupling lenses 2-1 and 2-2, respectively. Each of the coupled beams can be a weak divergent light flux, a weak convergent light flux, or a parallel light flux according to the optical property of an optical system located downstream of the coupling lenses.

The beams having passed through the coupling lenses 2-1 and 2-2 are "beam-shaped" by apertures 3-1 and 3-2, to enter a beam-combining prism 110. The beam-combining prism 110 has a reflection surface, a polarized-light separation film 110a, and a half-wave plate 110b. The beam emitted from the light source 1-2 is rotated 90 degrees on its polarization plane by the half-wave plate 110b, is reflected by the reflection surface of the beam-combining prism 110, is further reflected by the polarized-light separation film 110a, and is output from the beam-combining prism 100. The beam emitted from the light source 1-1 passes through the polarized-light separation film 110a and is output from the beam-combining prism 100. The two beams are combined in this manner.

The light source 1-1 and the coupling lens 2-1 are fixed to a laser diode (LD) base 111-1, and the light source 1-2 and the coupling lens 2-2 are also fixed to a LD base 111-2. The LD bases 111-1 and 111-2 are screwed into a flange 112. The apertures 3-1 and 3-2 and the beam-combining prism 100 are assembled so as to be sandwiched by the flange 112 and a holder 113, and the light source unit 101a is thus formed.

When the components are assembled, by adjusting respective positional relationships of the light emitting units of the light sources 1-1 and 1-2 with respect to the optical axes of the coupling lenses 2-1 and 2-2, the combined two beams mutually form a micro angle in the sub-scanning direction.

Figure 4:
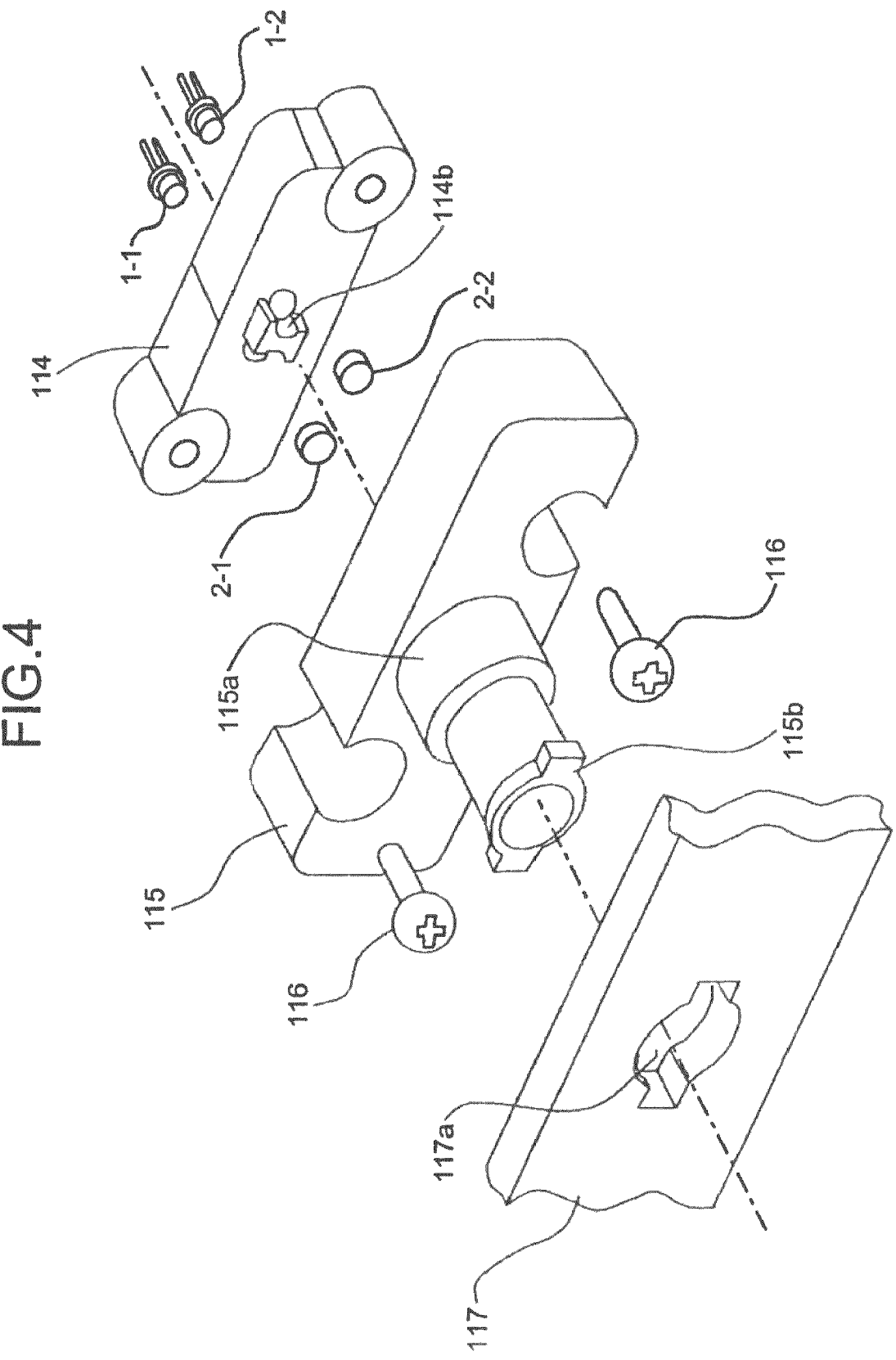
FIG. 4 is another example of components of the light source unit.
Figure 5:
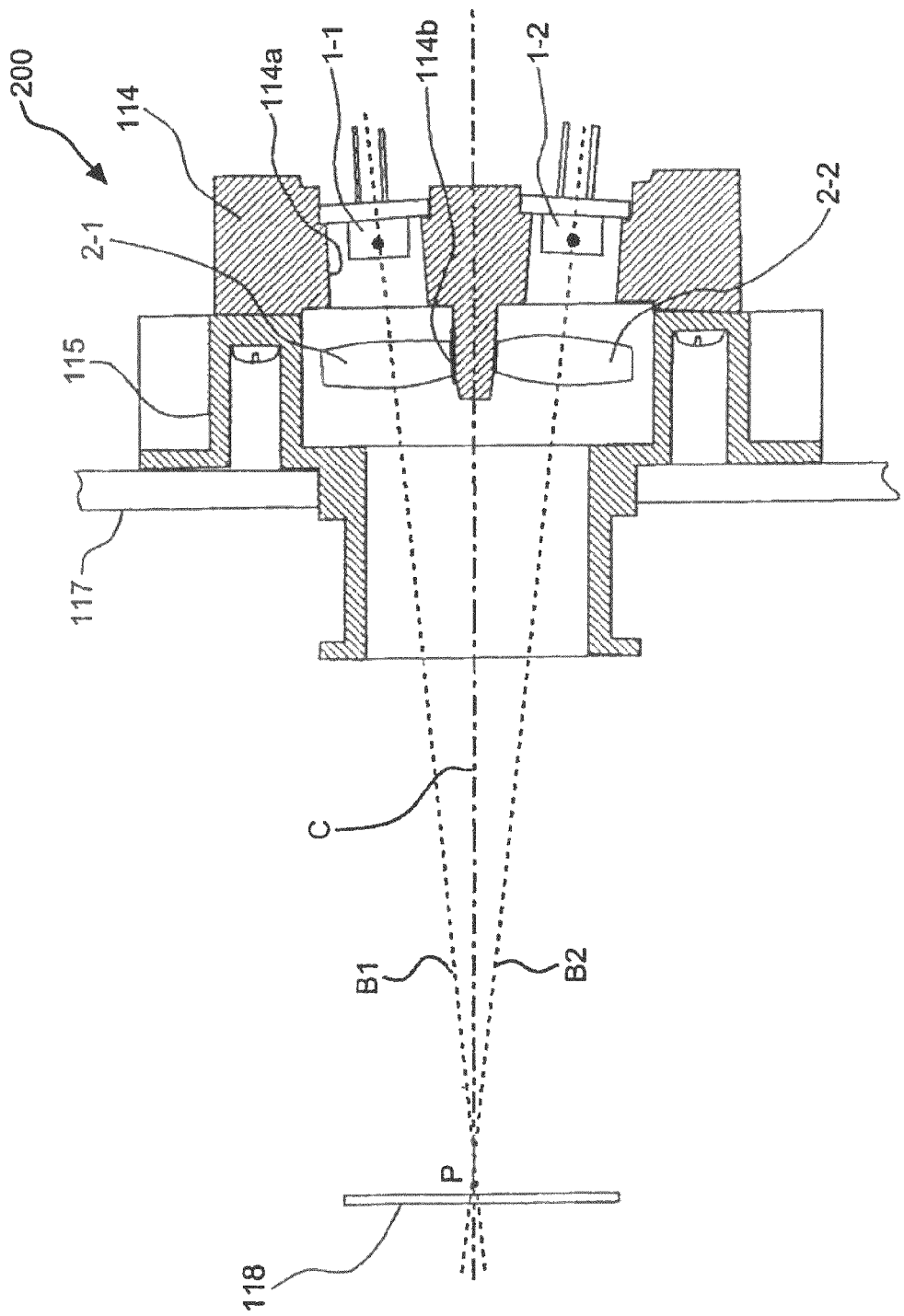
FIG. 5 is a cross section of the light source unit shown in FIG. 4.

When the ordinary semiconductor lasers are combined as shown in FIG. 4, the configuration as shown in FIG. 5 can be obtained. FIG. 4 is another example of components of the light source unit. FIG. 5 is a cross section of the light source unit shown in FIG. 4. More specifically, the light sources 1-1 and 1-2 are semiconductor lasers, each of which has a single light emitting point. Beams emitted from the respective light sources 1-1 and 1-2 are coupled by the coupling lenses 2-1 and 2-2 respectively. Each of the coupled beams can be a weak divergent light flux, a weak convergent light flux, or a parallel light flux according to the optical property of an optical system located downstream of the coupling lenses.

The light sources 1-1 and 1-2 and the coupling lenses 2-1 and 2-2 are fixed to one LD base 114, and the LD base 114 is fixed to a holder 115 with screws 116. The light sources 1-1 and 1-2 are attached to an inner wall 114a of the LD base 114 with a small space therebetween. The coupling lenses 2-1 and 2-2 are fixed to a central projection 114b of the LD base 114. A cylindrical light emitting unit 115a and a light-emitting front end 115b are provided in the holder 115. The cylindrical light emitting unit 115a is fitted into a frame hole 117a provided in a frame 117 of a housing for the optical scanning device, and a light source unit 200 is thereby supported by the frame 117.

In the light source unit configured as shown in FIG. 4 and FIG. 5, optical axes of the coupling lenses 2-1 and 2-2 are adjusted so as to form micro angles each with respect to the main scanning direction so that the optical axes intersect at a point P on a deflection/reflection facet 118 of a polygon mirror. Light beams B1 and B2 emitted from the light sources 1-1 and 1-2 travel along the optical axes respectively. By configuring the light source unit in the above manner, there is no need to provide the beam-combining prism 100 and the half-wave plate 110b used in the light source unit shown in FIG. 3, which enables achievement of a compact and low-cost light source unit.

Figure 6:
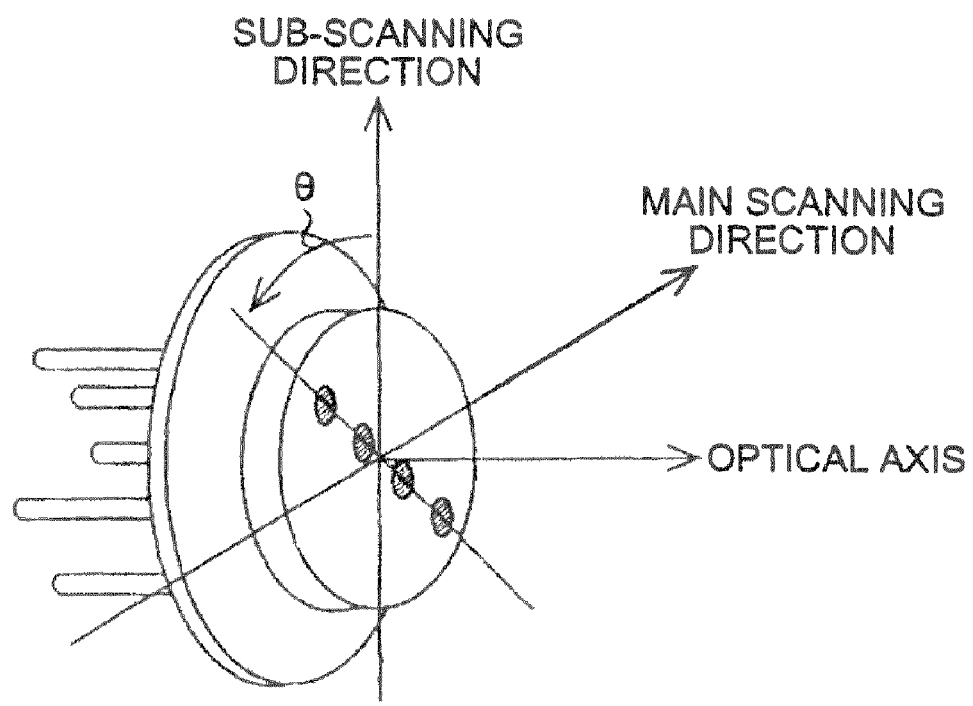
FIG. 6 is a perspective view of a semiconductor laser array having a plurality of light emitting points.

A semiconductor laser array (LD array) having a plurality of light emitting points as shown in FIG. 6 can also be used instead of the light source shown in FIG. 3 and the light source shown in FIGS. 4 and 5. FIG. 6 is a perspective view of a semiconductor laser array having a plurality of light emitting points. When the semiconductor laser array is used, to achieve a desired beam pitch on the surface to be scanned, the semiconductor laser array may be inclined by angle θ in the main scanning direction around the optical axis as shown in FIG. 6, depending on optical elements incorporated in an optical scanning device.

A consideration is given here to the case where the light sources 1-1 and 1-2 and the coupling lenses 2-1 and 2-2 are used in the light source units as shown in FIG. 3 and FIGS. 4 and 5. In this case, the coupling lenses 2-1 and 2-2 may be made of resin and may also be formed with diffraction optical elements each of which has a shape of a diffractive surface formed as a concentric groove shape.

When the semiconductor laser array as shown in FIG. 6 is used, however, it is preferable not to use the diffraction optical element as the coupling lens. This is because wavelengths of light beams emitted from the light emitting points in this case are not always the same as each other, and mode hopping phenomena occur discretely at the light emitting points, and thus, the variation of the wavelength causes image degradation to grow. To avoid the wavelength dependence, the coupling lens is preferably made of glass, and this enables stable images to be provided.

In FIG. 6, if a vertical cavity surface emitting laser (VCSEL) is used instead of the semiconductor laser array, there is almost no variation of the wavelength of light beams emitted from the light emitting points, and therefore, the coupling lens can be formed with a resin-made diffraction optical element.

A specific configuration of the optical scanning device according to the first embodiment is explained below.

The effect of the specific configuration explained below is not based on the configuration of the light source units explained with reference to FIGS. 3 to 6. Therefore, a light source with a single beam is explained for simplicity.

Data for a glass material (called "glass 1") and a resin material (called "resin 1") used in the specific configuration is shown in table 1 as follows.

TABLE 1

Material data

|  | Median | Wavelength hopping | Temperature variation | Linear expansion coefficient |
|---|---|---|---|---|
| Glass 1 | 1.511084 | 1.511068 | 1.511027 | $7.5 \times 10^{-6}$ |
| Resin 1 | 1.523867 | 1.523852 | 1.522026 | $7.0 \times 10^{-5}$ |

In the table 1, "median" is a refractive index for a wavelength to be used at a reference temperature of 25° C., "wavelength hopping" is a refractive index when wavelength hopping occurs caused by mode hopping, and "temperature variation" is a refractive index when the temperature rises 20 degrees from the reference temperature. For the "wavelength hopping" due to mode hopping, it is assumed that a wavelength change is 0.8 nanometer (nm), allowing for an unexpected change. Data for an optical system located downstream of the optical deflector is shown in table 2 as follows.

TABLE 2

Data for optical system downstream of optical deflector

|  | $R_m$ | $R_s$ | $D_x$ | $D_y$ | n |
|---|---|---|---|---|---|
| Optical deflector (Rotating axis) | — | — | 42.99 | 6.91 | — |
| Scanning lens | 179 | −96.399 | 13.5 | 0 | Resin 1 |
|  | −157.258 | −19.327 | 176 | 0 | — |
| Surface to be scanned | — | — | — | — | — |

In the table 2, Rm represents a paraxial curvature in the main scanning direction, Rs represents a paraxial curvature in the sub-scanning direction, Dx and Dy represent a relative distance from an origin of each optical element to an origin of a next optical element, and n represents a material to be used. Unit is millimeter (mm).

For example, referring to Dx and Dy with respect to the optical deflector, when viewed from the rotational axis of the optical deflector (polygon mirror 105a), the origin of the entrance surface of the scanning lens 106a (position of the optical axis on the surface of its entrance side) is 42.99 millimeters away from the optical deflector in the optical axis direction (x direction, vertical direction in FIG. 2), and is 6.91 millimeters away therefrom in the main scanning direction (y direction, horizontal direction in FIG. 2).

A wall thickness of the scanning lens 106a on the optical axis is 13.5 millimeters, and a distance from the scanning lens 106a to the surface 107a is 176 millimeters. The dustproof glass G2 made of glass 1 with a thickness of 1.9 millimeters is arranged between the scanning lens 106a and the surface 107a, as shown in FIG. 2.

The surfaces of the scanning lens 106a are aspherical surfaces, which are specific surfaces, both of which are non-circular arcs given by equation (1) as follows in the main scanning direction, and in which the curvature in a sub-scanning cross section (virtual cross section parallel to the optical axis and the sub-scanning direction) changes according to equation (2) as follows in the main scanning direction.

Non-Circular Arc:

This is expressed by equation (1) as follows:

$$X = \frac{Y^2/R_m}{1+\sqrt{1-(1+K_m)\cdot(Y/R_m)^2}} + A_1 \cdot Y + \tag{1}$$

$$A_2 \cdot Y^2 + A_3 \cdot Y^3 + A_4 \cdot Y^4 + A_5 \cdot Y^5 + A_6 \cdot Y^6 \dots$$

where Rm is a paraxial curvature radius in a main-scanning cross section, Y is a distance from the optical axis in the main scanning direction; K is a conical constant, A1, A2, A3, A4, A5, ... are high-order coefficients, and X is a depth in the optical axis direction.

Change in Curvature in Sub-Scanning Cross Section:

A state in which a curvature Cs(Y)(Y: coordinate in the main scanning direction based on the position of the optical axis as the origin) in the sub-scanning cross section changes in the main scanning direction is expressed by the following equation (2):

$$C_s(Y) = 1/R_s(0) + B_1 \cdot Y + B_2 \cdot Y^2 + B_3 \cdot Y^3 + B_4 \cdot Y^4 + B_5 \cdot Y^5 + B_6 \cdot Y^6 + \dots \tag{2}$$

where Rs (0) is a curvature radius in the sub-scanning cross section including the optical axis, and B1, B2, B3, ... are coefficients.

Coefficients of the surface on the entrance side (specific surface) of the scanning lens 106a are shown in table 3 as follows. Coefficients of the surface on its exit side (coaxial aspherical surface) are shown in table 4 as follows.

TABLE 3

| Coefficients in main scanning direction | | Coefficients in sub-scanning direction | |
|---|---|---|---|
| K | $-5.35584 \times 10$ | $B_1$ | 0 |
| $A_4$ | $-1.38469 \times 10^{-6}$ | $B_2$ | 0 |
| $A_6$ | $-1.57916 \times 10^{-9}$ | $B_3$ | 0 |
| $A_8$ | $3.65531 \times 10^{-12}$ | $B_4$ | 0 |
| $A_{10}$ | $-8.30685 \times 10^{-15}$ | $B_5$ | 0 |
| $A_{12}$ | $1.12844 \times 10^{-17}$ | $B_6$ | 0 |
| $A_{14}$ | $-5.98173 \times 10^{-22}$ | | |

TABLE 4

| Coefficients in main scanning direction | | Coefficients in sub-scanning direction | |
|---|---|---|---|
| K | 1.94524 | $B_1$ | $-2.08484 \times 10^{-5}$ |
| $A_4$ | $-9.04035 \times 10^{-7}$ | $B_2$ | $1.67626 \times 10^{-5}$ |
| $A_6$ | $-1.03608 \times 10^{-9}$ | $B_3$ | $-1.08187 \times 10^{-8}$ |
| $A_8$ | $1.32700 \times 10^{-12}$ | $B_4$ | $-1.01661 \times 10^{-8}$ |
| $A_{10}$ | $-3.07707 \times 10^{-15}$ | $B_5$ | $4.95931 \times 10^{-12}$ |

TABLE 4-continued

| | Coefficients in main scanning direction | | Coefficients in sub-scanning direction |
|---|---|---|---|
| $A_{12}$ | $3.39516 \times 10^{-18}$ | $B_6$ | $9.76946 \times 10^{-12}$ |
| $A_{14}$ | $-1.38719 \times 10^{-21}$ | | |

An example of using the diffractive surface according to the first embodiment for the coupling lens 102a as the optical element for coupling is explained below.

The coupling lens 102a is a resin lens in which one surface thereof is a step-shaped concentric diffractive surface, and the other surface is a rotationally symmetric aspherical surface.

Figure 7:
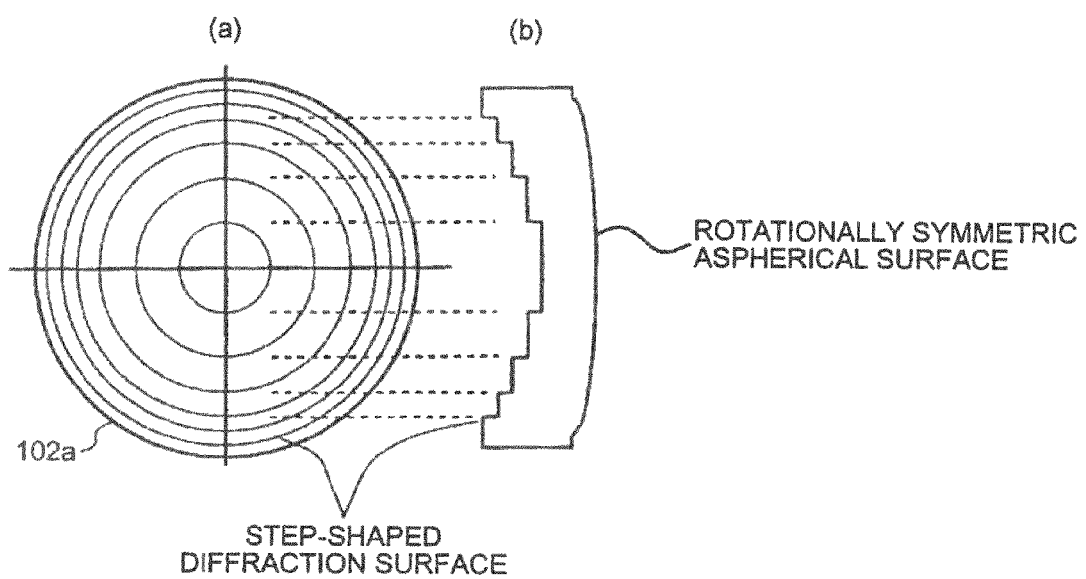
FIG. 7 is a front view and a side view of a coupling lens of the optical scanning device.

FIG. 7 is a front view and a side view of the coupling lens 102a. The horizontal direction of FIG. 7 represents the main scanning direction and the vertical direction thereof represents the sub-scanning direction. The coupling lens 102a of (a) in FIG. 7 is viewed from the optical axis direction, and that of (b) in FIG. 7 is its cross sectional shape. One side of the coupling lens 102a has the concentric diffractive surface which is formed into the step structure with a set of concentric grooves as shown in (b) of FIG. 7. The other side thereof has the refractive surface formed into the rotationally symmetric aspherical shape as shown in (b) of FIG. 7.

The cross section of the coupling lens 102a on its virtually cut surface parallel to the main scanning direction and the optical axis direction also has the same shape as shown in (b) of FIG. 7. As shown in (b) of FIG. 7, the coupling lens 102a is a lens in which its one side has the concentric diffractive surface formed into the step shape and the other surface has the refractive surface formed into the rotationally symmetric aspherical shape.

The light beam (divergent light beam) emitted from the light source enters the coupling lens 102a, and when passing through the coupling lens 102a, the light beam is converted to a light beam in a desired form, and is guided to the anamorphic lens 104a as the first optical system.

The power of the diffractive surface is set so that the change in the beam waist position in the main scanning direction and/or the sub-scanning direction is about 0, the change being caused by the temperature change in the light source unit (light emitting unit: semiconductor laser) 101a.

The diffractive surface of the coupling lens 102a in this case is used for the side of its entrance surface. The reason is as follows. As for the step-shaped diffractive surface, its diffractive portion has a plane perpendicular to the optical axis. If a "parallel" light flux is made to enter the plane, the parallel light flux is intensively reflected by the diffractive portion, and the reflected light flux goes back to the semiconductor laser along the light path in the reverse direction, which causes interference. In the case of the coupling lens 102a, however, a "divergent" light flux enters its entrance surface, and then the divergent light flux is in many cases converted to a parallel light flux and the parallel light flux is output from its exit surface. This is the reason why the step-shaped diffractive surface is preferably set on the side of the entrance surface.

The components of the optical system for the optical scanning device are explained below.

Light Source:

The semiconductor laser used for the light source unit 101a is such that a light emission wavelength in design is 785 nanometers and if the temperature rises 1° C. from a reference temperature of 25° C., then the light emission wavelength shifts to the long wavelength side by 0.25 nanometer. As for the mode hopping, as explained above, it is assumed that the wavelength change is 0.8 nanometer.

Coupling Lens:

The coupling lens 102a is a resin lens having the diffractive surface, and is disposed so that the lens has a focal length of 13.952 millimeters and has a function of converting the light beam to a weak divergent light beam. The aspheric surface is used for one side of the coupling lens 102a, so that the aspheric surface satisfactorily corrects the wavefront aberration of a coupled light beam.

The light source unit 101a and the coupling lens 102a are fixedly held by a holding element (LD bases 111-1 and 111-2 of FIG. 3, LD base 114 of FIGS. 4 and 5) with a material having a linear expansion coefficient of 7.0×10−5.

The diffractive surface on the entrance surface of the coupling lens 102a is expressed by the following equation where win is a phase function:

$$win = C0 \cdot r2$$

and r is $$r2 = Y2 + Z2$$

where Y is a coordinate in the main scanning direction based on the optical axis as the origin, and Z is a coordinate in the sub-scanning direction based on the optical axis as the origin, and C0 is a coefficient expressed by the following equation:

$$C0 = 5.693 \times 10-2$$

The diffractive portion is formed in the refractive portion which has a spherical surface with a curvature radius of −8.783 millimeters. Therefore, the formed diffractive surface becomes the step shape.

The refractive surface on the exit surface of the coupling lens 102a is the rotationally symmetric aspherical surface and a non-circular arc given by equation (3) as follows.

Rotationally Symmetric Aspherical Surface:

This is expressed by equation (3) as follows:

$$X = \frac{H^2/R_m}{1+\sqrt{1-(1+K_m)\cdot(H/R_m)^2}} + A_1 \cdot Y + \qquad (3)$$
$$A_2 \cdot Y^2 + A_3 \cdot Y^3 + A_4 \cdot Y^4 + A_5 \cdot Y^5 + A_6 \cdot Y^6 \ldots$$

where R is a paraxial curvature radius, H is a distance from the optical axis, K is a conical constant; A1, A2, A3, A4, A5, . . . are high-order coefficients, and X is a depth in the optical axis direction.

Coefficients of the surface on the exit side of the coupling lens 102a are shown in table 5 as follows.

TABLE 5

| K | $-4.131077 \times 10^{-1}$ |
|---|---|
| $A_4$ | $-9.127866 \times 10^{-5}$ |
| $A_6$ | $3.040886 \times 10^{-6}$ |
| $A_8$ | $-9.801258 \times 10^{-7}$ |
| $A_{10}$ | $7.710394 \times 10^{-8}$ |

Aperture:

The aperture 103a is a rectangular aperture with an aperture diameter in the main scanning direction of 2.76 millimeters and an aperture diameter in the sub-scanning direction of 2.36 millimeters, and shapes the light beam coupled by the coupling lens 102a.

Anamorphic Lens:

The anamorphic lens 104a which is the first optical system is obtained by forming the surface on its entrance side with a line-shaped diffractive surface formed into a plane and forming the surface of its exit side into a plane.

The diffractive surface on the entrance surface of the anamorphic lens 104a is expressed by the following equation:

$$win = Cz \cdot Z2$$

where win is a phase function, and Cz is a coefficient expressed by the following equation:

$$Cz = -1.3287 \times 10^{-2}$$

Optical Deflector:

The polygon mirror 105a of the optical deflector is as follows: the number of reflection facets is 6, and a radius of an inscribed circle is 13 millimeters. The soundproof glass G1 is made of the glass 1 and has a thickness of 1.9 millimeters, and a tilt angle α thereof from the y direction (horizontal direction of FIG. 2) is 12 degrees.

An angle θ is 68 degrees. More specifically, the angle is formed by a traveling direction of the light beam incident from the light source side and by a traveling direction of the light beam reflected on the deflection/reflection facet toward a position where an image height on the surface 107a is 0.

Changes in the beam waist positions in the main and sub-scanning directions of the optical scanning device according to the first embodiment are as shown in table 6.

TABLE 6

Changes in beam waist positions

|  | Wavelength hopping | Temperature variation |
|---|---|---|
| Main scanning direction | 0.36μμ | −0.49 μμ |
| Sub-scanning direction | 1.52 μμ | −1.82 μμ |

On the other hand, if the diffractive surface is not used for the coupling lens 102a, changes in the beam waist positions are as shown in table 7 as follows. It is obvious that the changes in the beam waist positions are respectively reduced by the effect of the diffractive surface.

TABLE 7

Changes in beam waist positions

|  | Wavelength hopping | Temperature variation |
|---|---|---|
| Main scanning direction | −6.28μμ | 8.76 μμ |
| Sub-scanning direction | −5.37 μμ | 7.64 μμ |

A consideration is given to the case where the diffractive surface of the optical scanning device according to the first embodiment contains a machining error.

For example, a groove pitch of the spherically formed concentric diffractive surface, which is used for the side of the entrance surface of the anamorphic lens 104a, is becoming narrower with distance from the optical axis. The groove pitch is about 100 micrometers (μm) even as a minimum value in the first embodiment. In contrast to this, it is assumed that the groove pitch contains machining errors of 2 micrometers, 4 micrometers, and 6 micrometers. The power of the anamorphic lens 104a is largely fluctuated by the machining error. If such an anamorphic lens 104a as above is mounted on the optical scanning device as it is, a focusing point of the light beam is largely defocused from the surface 107a, which increases a beam-spot diameter.

Figure 8A:
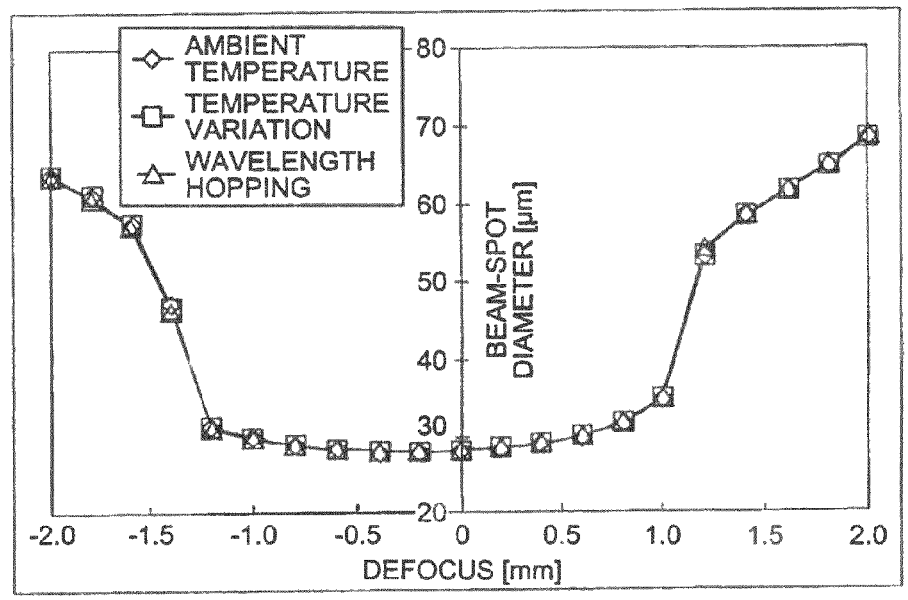
FIG. 8A is a graph of a relationship between defocus and beam-spot diameter of the optical scanning device in the main scanning direction.
Figure 8B:
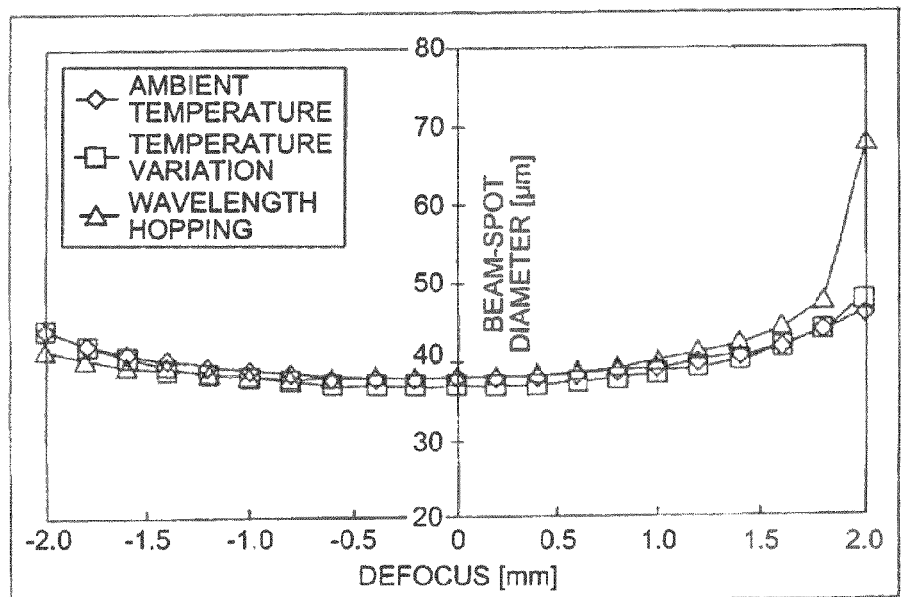
FIG. 8B is a graph of a relationship between defocus and beam-spot diameter of the optical scanning device in the sub-scanning direction.

FIG. 8A is a graph of a relationship between defocus and beam-spot diameter of the optical scanning device in the main scanning direction. FIG. 8B is a graph of a relationship between defocus and beam-spot diameter of the optical scanning device in the sub-scanning direction. If such an optical scanning device as above is applied to color optical printers in particular, the quality of color reproduction is degraded and the gradation is lost. However, the defocus of the focusing point of the light beam is almost the same over the whole image height, and thus, by shifting the anamorphic lens 104a in the optical axis direction, the defocus can be compensated.

Figure 9:
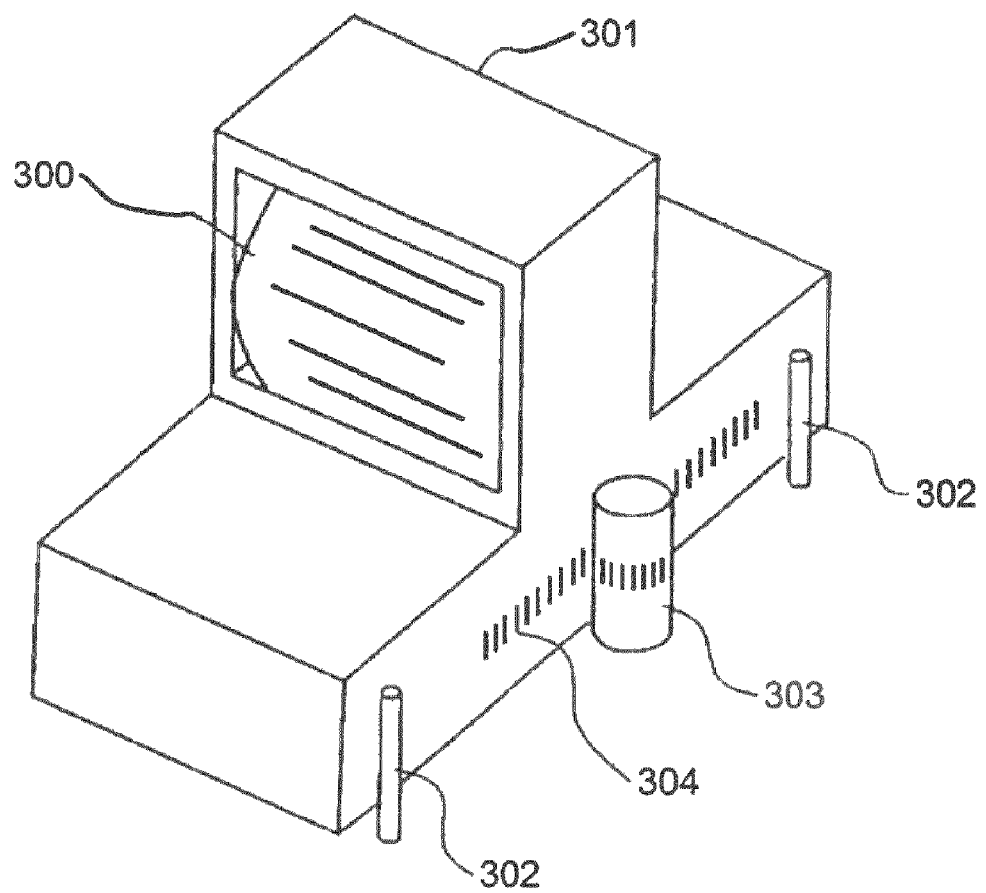
FIG. 9 is a schematic diagram of a focal-point adjusting mechanism of an anamorphic lens shown in FIG. 2.

FIG. 9 is a schematic diagram of a focal-point adjusting mechanism of an anamorphic lens according to the first embodiment. Reference numeral 300 represents an anamorphic lens, and 301 represents a holder for fixing the anamorphic lens. The holder 301 is positioned with a positioning reference pin 302 and a gear 303 provided in the housing of the optical scanning device by being pressurized with a spring (not shown) from the opposite side. A gear 304 is provided on the side face of the holder 301 at a portion contacting the gear 303 so as to be engaged with the gear 303. Therefore, by rotating the gear 303, the holder 302 moves along the optical axis direction in accordance with the rotation. This configuration allows the anamorphic lens 300 to shift in the optical axis direction, and thus, it is possible to obtain a desired beam spot on the surface to be scanned even if the diffractive surface used in the anamorphic lens contains the machining error.

There is also a method as follows can be used instead of such a mechanical structure as above. The method is implemented by adjusting the anamorphic lens 300 when fixed to the optical scanning device and fixing the anamorphic lens 300 thereto with adhesive. By using this method, there is no need to provide the adjusting mechanism, and thus, it is advantageous that unnecessary components can be removed from the optical scanning device.

Figure 10A:
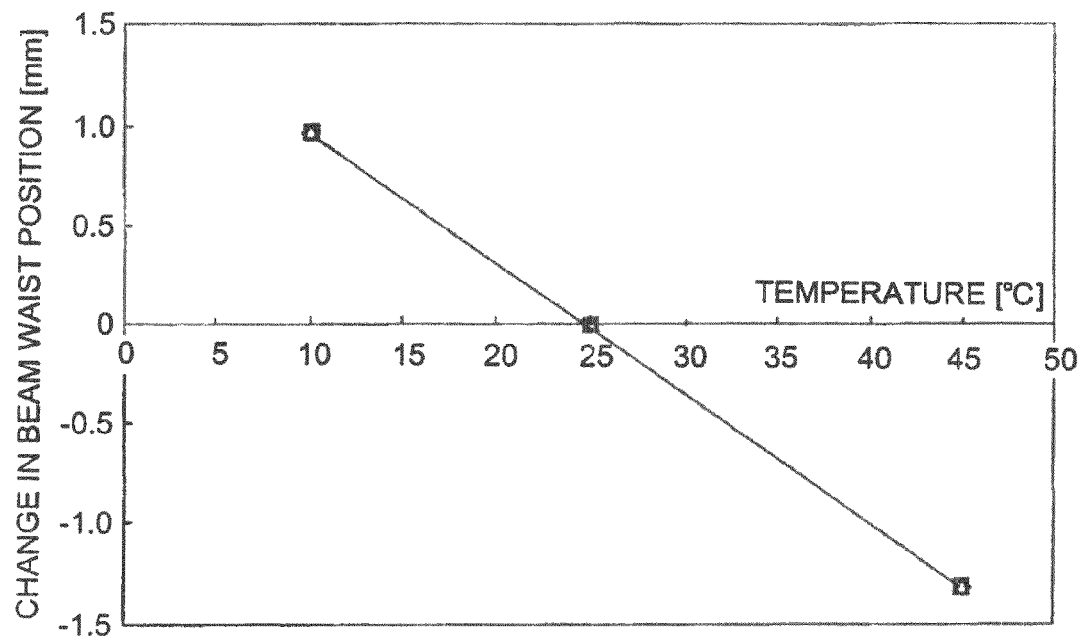
FIG. 10A is a graph of a relationship between atmosphere temperature and a change in a beam waist position of the optical scanning device in the main scanning direction.
Figure 10B:
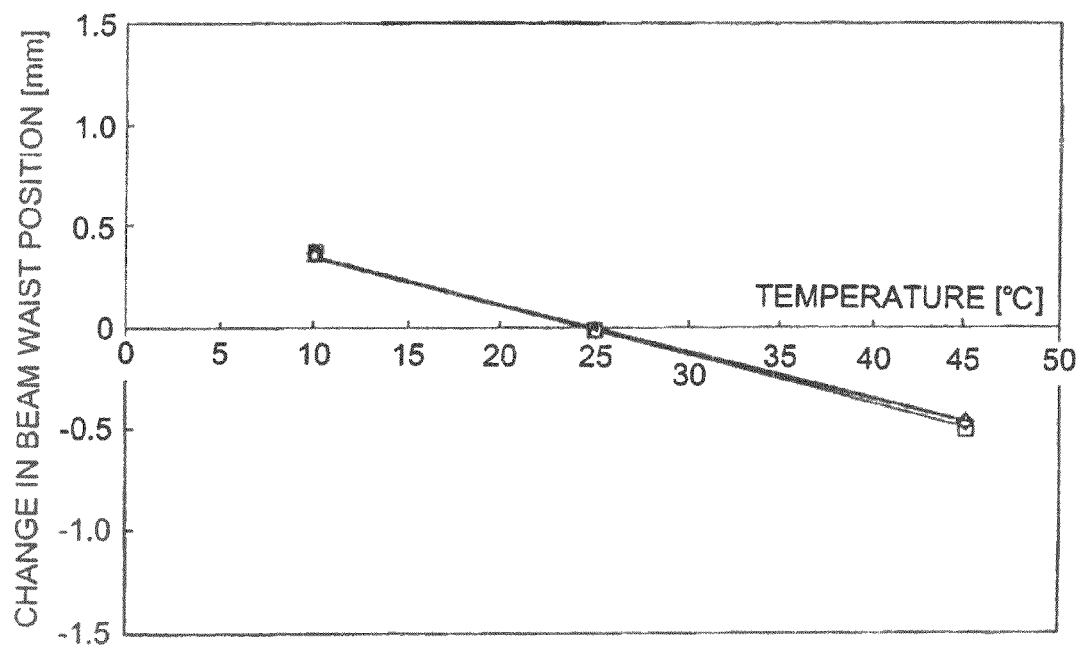
FIG. 10B is a graph of a relationship between atmosphere temperature and a change in a beam waist position of the optical scanning device in the sub-scanning direction.

It is important, as a precondition of this method, to obtain a desired diffraction effect even if the anamorphic lens 300 contains any machining error. However, even there are machining errors of 2 micrometers, 4 micrometers, and 6 micrometers in the groove pitches, the diffraction effect that is quite the same as that of the design median can be expected. FIGS. 10A and 10B show this fact, and it is understood that when the atmospheric temperature of the anamorphic lens varies from 25° C. to 10° C. and 45° C., the focal length of the anamorphic lens changes in the same manner as the variation.

The components of the optical system for the optical scanning device according to the first embodiment are as follows.

Light Source:

The semiconductor laser used for the light source unit 101a is such that a light emission wavelength in design is 785 nanometers and if the temperature rises 1° C. from the reference temperature of 25° C., then the light emission wavelength shifts to the long wavelength side by 0.25 nanometer. As for the mode hopping, as explained above, it is assumed that the wavelength change is 0.8 nanometer.

Coupling Lens:

The coupling lens 102a is a resin lens having the diffractive surface as explained in the specific configuration, and is disposed so that the lens has a focal length of 12.5 millimeters and has a function of converting the light beam to a weak divergent light beam. The aspheric surface is used for one side of the coupling lens 102a, so that the aspheric surface satisfactorily corrects the wavefront aberration of the coupled light beam.

The light source unit 101a and the coupling lens 102a are fixedly held by the holding element (LD bases 111-1 and 111-2 of FIG. 3, LD base 114 of FIGS. 4 and 5) with a material having a linear expansion coefficient of 5.0×10−5.

The diffractive surface on the entrance surface of the coupling lens 102a is expressed by the following equation:

$$win = C0 \cdot r2$$

where win is a phase function and r is:

$$r2 = Y2 + Z2$$

where Y is a coordinate in the main scanning direction based on the optical axis as the origin, and Z is a coordinate in the sub-scanning direction based on the optical axis as the origin, and C0 is a coefficient expressed by the following equation:

$$C0 = 5.415 \times 10-2$$

The diffractive portion is formed in the refractive portion which has a spherical surface with a curvature radius of −9.2342 millimeters. Therefore, the formed diffractive surface becomes the step shape.

The refractive surface on the exit surface of the coupling lens 102a is the rotationally symmetric aspherical surface, and the non-circular arc given by the equation (3).

Coefficients of the surface on the exit side of the coupling lens 102a are as shown in table 8.

TABLE 8

| | |
|---|---|
| K | −4.131077 × 10$^{−1}$ |
| $A_4$ | −9.127866 × 10$^{−5}$ |
| $A_6$ | 3.040886 × 10$^{−6}$ |
| $A_8$ | −9.801258 × 10$^{−7}$ |
| $A_{10}$ | 7.710394 × 10$^{−8}$ |

Aperture:

The aperture 103a is a rectangular aperture with an aperture diameter in the main scanning direction of 2.78 millimeters and an aperture diameter in the sub-scanning direction of 2.4 millimeters, and shapes the light beam coupled by the coupling lens 102a.

Anamorphic Lens:

The anamorphic lens 104a is obtained by forming the surface of its entrance side with a line-shaped diffractive surface formed in a step shape and forming the surface of its exit side with a cylindrical surface.

The diffractive surface on the entrance surface of the anamorphic lens 104a is expressed by the following equation:

$$win = Cz \cdot r2$$

where win is a phase function and r is:

$$r2 = Y2 + Z2$$

where Y is a coordinate in the main scanning direction based on the optical axis as the origin, and Z is a coordinate in the sub-scanning direction based on the optical axis as the origin, and Cz is a coefficient expressed by the following equation:

$$Cz = 2.829 \times 10-2$$

The diffractive portion is formed in the refractive portion which has a cylindrical surface with a curvature radius of 17.675 millimeters. Therefore, the formed diffractive surface becomes the step shape. The refractive surface on the exit surface is a cylindrical surface with a curvature radius of 19.723 millimeters.

Optical Deflector:

The polygon mirror 105a of the optical deflector is as follows: the number of reflection facets is 6, and a diameter of an inscribed circle is 13 millimeters. The soundproof glass G1 is made of the glass 1 and has a thickness of 1.9 millimeters, and a tilt angle α thereof from the y direction (horizontal direction of FIG. 2) is 12 degrees.

An angle θ is 68 degrees. More specifically, the angle is formed by a traveling direction of the light beam incident from the light source side and by a traveling direction of the light beam reflected on the deflection/reflection facet toward a position where an image height on the surface 107a is 0.

Changes in the beam waist positions in the main and sub-scanning directions of the optical scanning device according to the first embodiment are as shown in table 9 as follows. It is obvious that the changes in the beam waist positions are respectively reduced by the effect of the diffractive surface.

TABLE 9

Changes in beam waist positions

| | Wavelength hopping | Temperature variation |
|---|---|---|
| Main scanning direction | −1.14 μμ | −0.52 μμ |
| Sub-scanning direction | −1.95 μμ | 0.02 μμ |

The configuration, operation, and functional effect of an optical scanning device according to the second embodiment are explained in detail below with reference to the accompanying drawings.

Figure 11:
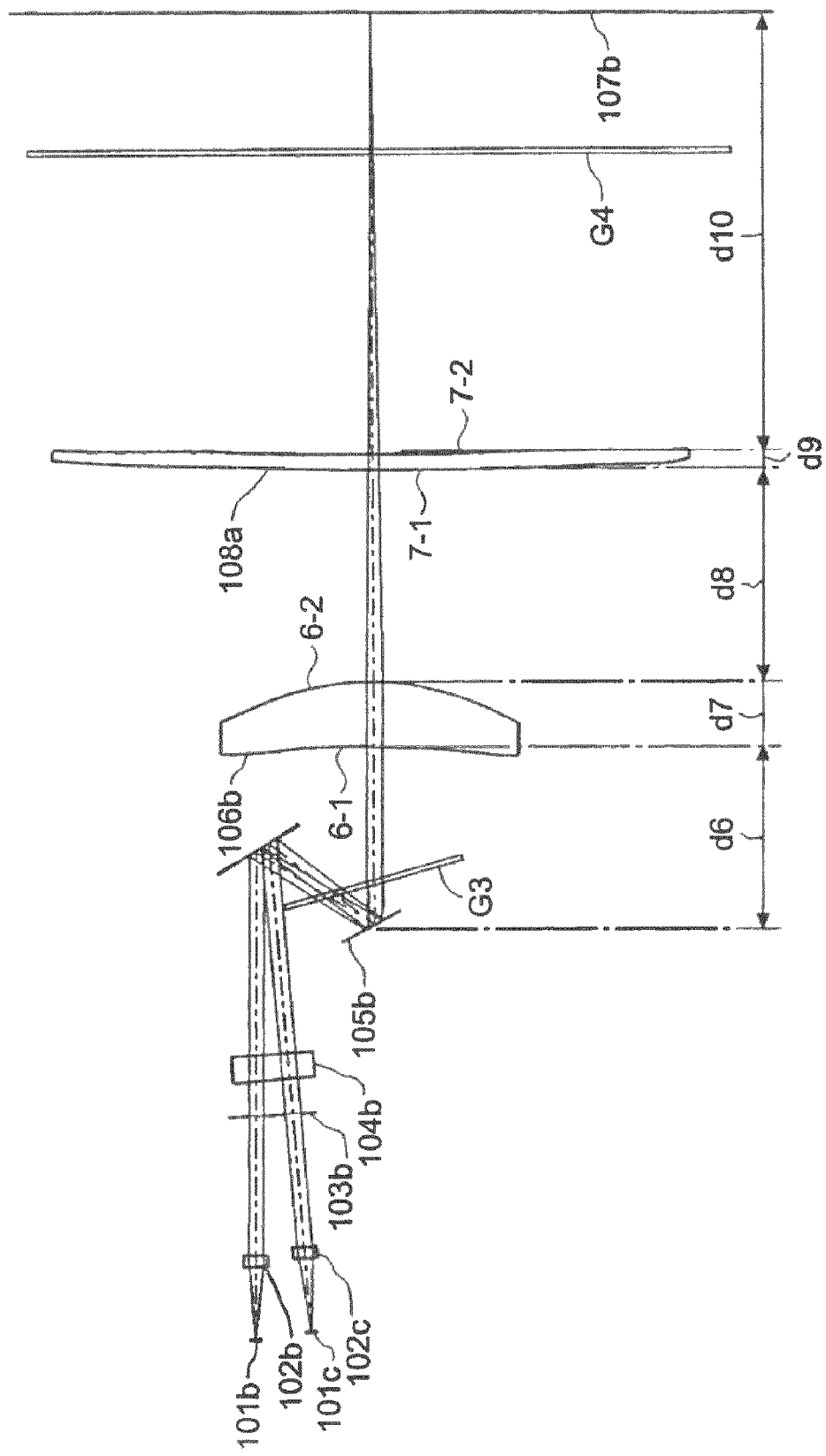
FIG. 11 is an example of an optical scanning device according to a second embodiment of the present invention.

FIG. 11 is an example of a basic configuration of the optical scanning device according to the second embodiment. In FIG. 11, an optical system forming the optical scanning device is developed on a plane (called "main-scanning plane" or "main-scanning cross section") passing through the optical axis and parallel to the main scanning direction (a deflecting/scanning direction by a deflecting unit).

As shown in FIG. 11, the optical system includes light source units (semiconductor lasers) 101b and 101c, coupling lenses (first lenses) 102b and 102c, an aperture (aperture stop) 103b, an anamorphic lens (second lens) 104b, a polygon mirror 105b of a deflector (polygon scanner) which is a deflecting unit (only one deflection facet of the polygon mirror is shown in FIG. 11), a scanning lens 106b, an image-plane-side scanning lens 108a, a soundproof glass G3, a surface 107b to be scanned, and a dustproof glass G4.

The light source units 101b and 101c are semiconductor lasers, each of which has a cover glass with a thickness of 0.3 millimeter, and light fluxes emitted from the light source units 101b and 101c are made to weak divergent light beams by the coupling lenses 102b and 102c, respectively. The weak divergent light beams pass through the aperture 103b, and the anamorphic lens 104b causes the weak divergent light beams to be parallel lights in the main scanning direction and to be light fluxes focused near the polygon mirror 105b in the sub-scanning direction. Furthermore, the light fluxes are deflected by the polygon mirror 105b, and an image is formed on the surface 107b through the dustproof glass G4 by the scanning lens 106b and the image-plane-side scanning lens 108a. The soundproof glass G3 is arranged between the polygon mirror 105b and the scanning lens 106b. The light source unit 101b and the coupling lens 102b (the light source unit 101c and the coupling lens 102c) are fixed to a same holding element made of aluminum.

The coupling lenses (first lenses) 102b and 102c are glass-made lenses each of which has a refractive surface, and the anamorphic lens (second lens) 104b is a resin lens having only one diffractive surface. The scanning lens 106b and the image-plane-side scanning lens 108a are resin lenses.

When the resin lens with an aspheric surface is used for the scanning lens, the temperature of the optical scanning device may rise by heat generation due to the rotation of the deflector (polygon scanner) or by a fixing unit of the image forming apparatus. In this case, fluctuations as follows occur:

Increase in the wavelength

Decrease in the refractive index

Expansion of the shape

When the ordinary refractive surface is used, the three fluctuations cause the beam waist position to change in a direction in which it is away from the deflector (plus direction in this case). However, the diffractive surface of the anamorphic lens 104b changes so that the focal length becomes shorter as the wavelength is longer. If the temperature rises, the diffractive surface changes in a direction in which the focal length is shorter (minus direction in this case), to cancel the fluctuations due to the refractive surface, which enables the change in the focal length upon temperature variation to be reduced as a total. If a plurality of beams passes through the diffractive surface, however, there come up problems as follows:

(1) A difference in diffraction efficiency due to a wavelength difference between beams (2) To uniformly keep a scanning line pitch between beams (3) To make the diameter of a beam spot of beams smaller.

If the diffractive surface is designed in the first order, then the difference in diffraction efficiency due to the wavelength difference is improved more as a smaller number of diffractive surfaces are provided. In the case of a plurality of beams, it is better to set only one diffractive surface in the first optical system on the light source side rather than the deflecting unit, allowing for the stable beam waist position.

For example, it is considered that a plurality of semiconductor lasers with the median of its wavelength of 780 nanometers is used. In this case, the specification of the semiconductor lasers is usually 780−10 nanometers to 780+15 nanometers, and a wavelength difference about 25 nanometers at maximum can possibly occur. At this time, if only one diffractive surface is used, the difference in the diffraction efficiency becomes 0.35%, which is within an allowable level as the optical scanning device for high-quality images. If two diffractive surfaces are used, however, the difference in the diffraction efficiency becomes 0.7%, which results in occurrence of problems in the optical scanning device for high-quality images. Furthermore, if a plurality of beams is used, it is better to provide only one diffractive surface in the first optical system to minimize variation of the scanning line pitch between the beams due to the wavelength difference and attain a small diameter of the beam spot of the beams.

Although the case of using the resin lens for the scanning lens is explained above, the second embodiment can also be used for the case where the glass-made lens is used for the scanning lens.

Generally, an anamorphic optical system, in which powers in the main and sub-scanning directions are different, is used for the entire optical system of the optical scanning device, and the power of the diffractive surface is made preferably different in the main and sub-scanning directions to provide the temperature compensation as explained above. To do so, there is also the method of discretely providing temperature compensation in the main and sub-scanning directions by using the concentric diffractive surface and the linear diffractive surface as is disclosed in Japanese Patent Application Laid-Open No. 2005-258392. This method, however, has the problem as explained above.

Therefore, in the second embodiment, by using only one diffractive surface of which elliptical diffraction grooves have different powers in the main and sub-scanning directions, it is possible to solve the problem and to discretely provide temperature compensation in the main and sub-scanning directions. By satisfying a relationship as follows:

$$|\beta m0| > |\beta s0|$$

where $\beta m0$ is a lateral magnification in the main scanning direction of the entire optical system and $\beta s0$ is a lateral magnification in the sub-scanning direction, the anamorphic lens 104b can once form a linear image, and the deflection facet and the surface to be scanned can be made close to conjugate. At this time, unevenness of the scanning line pitch due to the facet tilt of the deflecting unit such as the polygon mirror 105b can be reduced.

At the same time, to reduce degradation of the optical property (beam-spot diameter) caused by the wavelength difference between the beams, it is preferred that an absolute value of diffraction power in the sub-scanning direction, in which an absolute value of the lateral magnification is small, is made greater than that of diffraction power in the main scanning direction. The coupling lens 102b for coupling a divergent light flux and the anamorphic lens 104b for guiding the beam from the first lens to the deflecting unit can form the first optical system. At this time, because there is the relationship as follows:

$$|\beta m0| > |\beta s0|$$

it is better to provide the diffractive surface in the anamorphic lens 104b rather than the coupling lens 102b.

Figure 12:
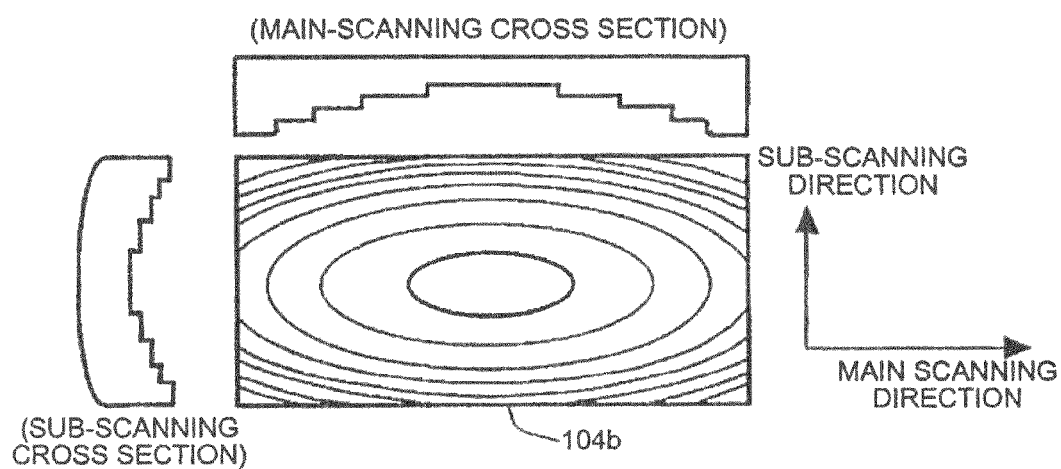
FIG. 12 is a front view and cross sections of a diffractive surface of an anamorphic lens shown in FIG. 11.

FIG. 12 is a front view and cross sections of the diffractive surface of the anamorphic lens according to the second embodiment. The anamorphic lens 104b is provided with the diffractive surface in which the absolute value of the diffraction power in the sub-scanning direction is made greater than the diffraction power in the main scanning direction, which enables reduction in degradation of the optical property (beam-spot diameter) caused by the wavelength difference between the beams. As shown in FIG. 12, the schematic shape of the anamorphic lens 104b is formed with a cylindrical surface, as its first surface, having a positive power in the sub-scanning direction and with a diffractive surface, as its second surface, formed in such a manner that the absolute values of the diffraction power and the refraction power are equal to each other but their signs are opposite to each other.

As also shown in FIG. 12, the shape of the diffractive surface is a step shape, and it is therefore possible to use the method of forming the diffractive surface like the shaper machining so as not to produce a machining trace, and also reduce the machining time. The reduction of the machining time can provide a side benefit such as reduction of heat generation during machining, and this is preferable to obtain a high-precision diffractive surface. In addition, the diffractive surface can be finished extremely smoothly to obtain high surface precision thereof, and thus, there is almost no scattered light nor beam spot of large diameter. Moreover, the diffractive surface is such that the absolute values of the diffraction power and the refraction power are equal to each other but their signs are opposite to each other. Consequently, the powers as the whole become 0 (non-power), and thus, the diffractive surface is formed so as to be also extremely strong against eccentricity between the surfaces.

A machining error and a variation of wavelength of the light source cause light-use efficiency of the diffractive surface of the anamorphic lens 104b to inevitably decrease. As shown in FIG. 12, however, the diffractive surface is formed only in one surface thereof, and the light-use efficiency can thereby be improved.

The power of the diffractive surface of the anamorphic lens 104b is set so as to satisfy the following equations (4) to (6):

$$|P3| \geq |P1+P2| \quad (4)$$

$$|P1| > |P1+P2| \text{ and } |P2| > |P1+P2| \quad (5)$$

$$P1 \times P3 > 0 (\rightarrow \text{temperature correction effect}) \quad (6)$$

where

P1 is a power in the main scanning direction or the sub-scanning direction of the diffractive portion in the diffractive surface of the anamorphic lens 104b, P2 is a power of the refractive portion of the diffractive surface in the direction defined by P1, P3 is a power of a surface, not being the diffractive surface of the anamorphic lens 104b, in the direction defined by P1.

The equation (5) indicates that the power of the diffractive portion of the diffractive surface and the power of the refractive portion thereof are set so as to be cancelled.

Furthermore, |P1|>|P1+P2| indicates that the absolute value of the power of the diffractive portion is cancelled by being added with the power of the refractive portion, and |P2|>|P1+P2| indicates that the absolute value of the power of the refractive portion is cancelled by being added with the power of the diffractive portion. At this time, the power of the diffractive surface as the whole decreases. Furthermore, by satisfying |P3|≧|P1+P2| as the equation (4), the power of the entire surface of the refractive portion can be distributed, which makes it possible to form an optical element strong against eccentricity between the surfaces.

The power of the diffractive surface decreases by satisfying the equation (5), and the shape of the diffractive surface during this process is getting closer to the step shape. As the most ideal shape, the step shape is the best. By simply satisfying the equation (5), it is possible to use the method of forming the diffractive surface like the shaper machining so as not to produce a machining trace, and also reduce the machining time. The reduction of the machining time can provide the side benefit such as reduction of heat generation during machining, and this is preferable to obtain a high-precision diffractive surface.

The diffractive surface can surely be finished extremely smoothly to obtain high surface precision thereof, and thus, there is almost no scattered light nor beam spot of large diameter. Particularly, in the multibeam optical system as shown in FIG. 11, the configuration is very effective because it is necessary to avoid a ghost beam produced in one of the beams from entering another light source. Furthermore, because the power of the entire diffractive surface decreases, it is possible to implement an optical scanning device having a satisfactory optical property such that it is hardly affected by eccentricity between the surfaces even if passage positions of the beams are different from each other when the beams pass through the diffractive surface of the anamorphic lens 104b.

As explained above, by distributing the power of the entire surface to the refractive surface, it is possible to obtain the optical element strong against eccentricity between the surfaces. However, the most desirable condition is to set the power of the diffractive surface to 0 (non-power). More specifically, it is simply set to P1=−P2. By thus setting, it is possible to implement the optical scanning device in which the beam-spot diameter is hardly degraded even if the diffractive surface is eccentric to the refractive surface. Moreover, if the diffractive surface has the step structure, it is possible to use the method of forming the diffractive surface like the shaper machining so as not to produce a machining trace, and also reduce the machining time. The reduction of the machining time can provide the side benefit such as reduction of heat generation during machining, and this is preferable to obtain a high-precision diffractive surface with power.

The power of the lens itself is given as a combination of the power of the entrance surface and the power of the exit surface. However, by appropriately setting the power on the opposite side even if the surface on one side has no power, desired lens power can be obtained. Therefore, the diffractive surface having the step structure can be used for lenses having any power.

The diffractive surface can be finished highly smoothly because there is no nonplanar portion even locally, and thus, there is almost no scattered light nor beam spot of large diameter. Particularly, in the multibeam optical system as shown in FIG. 11, the configuration is very effective because it is necessary to avoid a ghost beam produced in the beam emitted from one light source, from entering another light source. Furthermore, because the power of the entire diffractive surface decreases, it is possible to implement an optical scanning device having a satisfactory optical property such that it is hardly affected by eccentricity between the surfaces even if passage positions of the beams are different from each other when the beams pass through the diffractive surface of the anamorphic lens 104b.

Removal of diffracted light of an unnecessary diffraction order and of scattered light is one of tasks on the diffractive surface of the anamorphic lens 104b. Particularly, in the multibeam optical system as shown in FIG. 11, the task is important because it is necessary to avoid a ghost beam produced in the beam emitted from one light source, from entering another light source. The aperture 103b (aperture stop) is provided in the first optical system located upstream of the deflector to obtain a desired beam-spot diameter on the surface to be scanned (image plane) no matter how widely a divergence angle of the semiconductor laser varies. Part of the diffracted light of an unnecessary diffraction order and the scattered light produced on the diffractive surface of the anamorphic lens 104b can be removed by the aperture stop, but this is insufficient.

Figure 13:
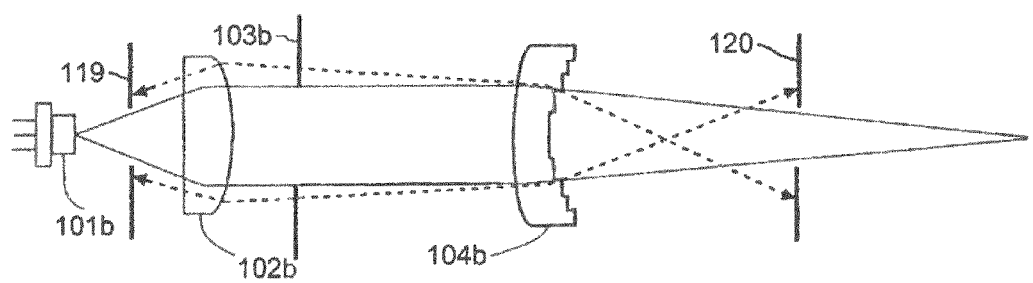
FIG. 13 is a schematic diagram of an optical system in which a plurality of shielding elements is provided in the optical scanning device shown in FIG. 11.

FIG. 13 is a schematic diagram of an optical system in which a plurality of shielding elements is provided in the optical scanning device according to the second embodiment. The first optical system is configured to arrange shielding elements 119 and 120 at a plurality of different locations in the optical axis direction, which allows removal of the diffracted light of an unnecessary diffraction order and the scattered light, and thus, the optical scanning device for satisfactory images can be implemented. Moreover, by narrowing the width of a beam when passing through at least one shielding element 119 (or 120) other than the aperture (aperture stop) 103b than the width of a beam when passing through the aperture (aperture stop) 103b in the main scanning direction and/or the sub-scanning direction, the diffracted light of an unnecessary diffraction order and the scattered light can be effectively removed.

Although there is a method of arranging the aperture (aperture stop) 103b at a location where the width of the light flux is narrow, this is not the best solution because the change in the beam-spot diameter due to the machining error in the width of the aperture increases. FIG. 13 is a sub-scanning cross section of the optical scanning device according to the second embodiment, and the same goes for the main scanning direction.

As explained above, the difference of the diffraction efficiency caused by a wavelength difference between beams is studied as the problem on the optical scanning device according to the second embodiment, but the light-use efficiency of any optical element other than the diffraction element is also required to be made coincident with each other between the beams. It is therefore necessary to set the deflecting direction of the beams to almost the same direction.

Figure 14:
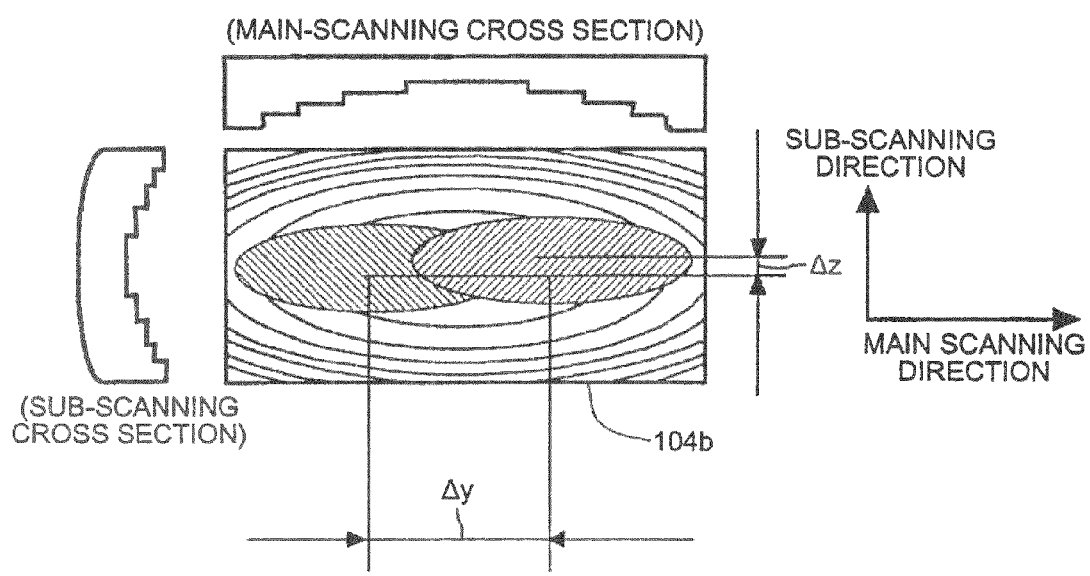
FIG. 14 is a front view and cross sections for explaining how two beams pass through the anamorphic lens shown in FIG. 11.

In the case of the configuration shown in FIG. 11, the two beams passing through the anamorphic lens (second lens) 104b having the diffractive surface become like elliptical portions shaded as shown in FIG. 14. Let Δy be a maximum distance between beams (distance between centers of the two beams) in the main scanning direction and let Δz be a maximum distance between beams (distance between centers of the two beams) in the sub-scanning direction, Δy>Δz. In this case, if a relationship between diffraction powers is as follows:

$$|Pm1|<|Ps1|$$

where Pm1 is a diffraction power in the main scanning direction and Ps1 is a diffraction power of the sub-scanning direction, i.e., if $$(\Delta y - \Delta z)\cdot(|Pm1|-|Ps1|)<0$$

even if the distance in the main scanning direction becomes wider, the difference of the diffraction power in the sub-scanning direction decreases, and resultantly, the same level of the diffraction effect can be provided to the beams.

Specific data for the optical system of the optical scanning device according to the second embodiment is shown below.

The data for a glass material (called "glass 2") and a resin material (called "resin 2") used in the second embodiment are as shown in table 10.

TABLE 10

Material data

| | Median | Wavelength hopping | Temperature variation | Linear expansion coefficient |
|---|---|---|---|---|
| Glass 2 | 1.515141 | 1.515116 | 1.515062 | $7.5 \times 10^{-6}$ |
| Resin 2 | 1.527257 | 1.527229 | 1.525368 | $7.0 \times 10^{-5}$ |

In the table 10, "median" is a refractive index for a wavelength to be used at a reference temperature of 25° C., "wavelength hopping" is a refractive index when wavelength hopping occurs caused by mode hopping, and "temperature variation" is a refractive index when the temperature rises 20 degrees from the reference temperature. For the "wavelength hopping" due to mode hopping, it is assumed that a wavelength change is 0.8 nanometer, allowing for an unexpected change. Data for the optical system located downstream of the optical deflector is shown in table 11.

TABLE 11

Data for optical system downstream of optical deflector optical deflector

| | $R_m$ | $R_s$ | $D_x$ | $D_y$ | n |
|---|---|---|---|---|---|
| Optical deflector (Rotating axis) | — | — | 43.3 | 2.9 | — |
| Scanning lens6-1 | −110.142 | −472.788 | 8 | 0 | Resin 2 |
| Scanning lens6-2 | −57.939 | −500. | 101.1 | | |
| Scanning lens7-1 | −5000. | 93.8 | 3 | 0 | Resin 2 |
| Scanning lens7-2 | 724.16 | −60.71 | 139.9 | | |
| Surface to be scanned | — | — | — | | |

In the table 11, Rm represents a paraxial curvature in the main scanning direction, Rs represents a paraxial curvature in the sub-scanning direction, Dx and Dy represent a relative distance from an origin of each optical element to an origin of a next optical element, and n represents a material to be used. Unit is millimeter (mm). A scanning lens 6-1 is a first surface (entrance surface) of the scanning lens 106b and a scanning lens 6-2 is a second surface (exit surface) thereof, and a scanning lens 7-1 is a first surface (entrance surface) of the image-plane-side scanning lens 108a and a scanning lens 7-2 is a second surface (exit surface) thereof.

For example, referring to Dx and Dy with respect to the optical deflector, when viewed from the rotational axis of the optical deflector (polygon mirror 105b), the origin of the entrance surface of the scanning lens 106b (the position of the optical axis on the surface of its entrance side) is 43.3 millimeters away from the optical deflector (distance indicated by d6 in FIG. 11) in the optical axis direction (x direction (horizontal direction in FIG. 11)), and is 2.9 millimeters away therefrom in the main scanning direction (y direction (vertical direction in FIG. 11)).

From the table 11, each distance in FIG. 11 is as follows: d7=8 mm, d8=101.1 mm, d9=3 mm, and d10=139.9 mm.

The dustproof glass G4 made of the glass 2 with a thickness of 1.9 millimeters is arranged between the image-plane-side scanning lens 108a and the surface to be scanned (image plane) 107b, as shown in FIG. 11.

The surfaces of the scanning lens 106b and the image-plane-side scanning lens 108a are aspherical surfaces, which are specific surfaces, all of which are non-circular arcs given by equation (7) as follows in the main scanning direction, and in which the curvature in a sub-scanning cross section (virtual cross section parallel to the optical axis and the sub-scanning direction) changes according to equation (8) as follows in the main scanning direction.

More specifically, the non-circular arc in the main scanning surface (which includes the optical axis of the lens and a virtual-plane cross section parallel to the main scanning direction) is expressed by the following polynomial equation using X which is a depth in the optical axis direction:

$$X=(Y2/Rm)/[1+\sqrt{\{1-(1+K)(Y/Rm)2\}}]+A1\cdot Y+A2\cdot Y2+A3\cdot Y3+A4\cdot Y4+A5\cdot Y5+A6\cdot Y6+\ldots \quad (7)$$

where Rm is a paraxial curvature radius in the main scanning surface in the optical axis, Y is a distance from the optical axis in the main scanning direction, K is a conical constant, and A1, A2, A3, A4, A5, A6, . . . are high-order coefficients. If one or more of odd-order coefficients: A1, A3, A5 . . . is "not 0", then the non-circular arc given by the equation (7) becomes asymmetric in the main scanning direction.

If the curvature in the sub-scanning direction (curvature of the lens surface in the virtual-plane cross section perpendicular to the main scanning direction) changes together with a coordinate Y in the main scanning direction, this case is expressed by the following polynomial equation:

$$Cs(Y)=\{1/Rs(0)\}+B1\cdot Y+B2\cdot Y2+B3\cdot Y3+B4\cdot Y4+B5\cdot Y5+\ldots \quad (8)$$

If one or more of odd-order coefficients: B1, B3, B5 . . . is "not 0", then the curvature in the sub-scanning given by the equation (8) changes asymmetrically in the main scanning direction.

Coefficients of the surface on the entrance side (specific surface) of the scanning lens 106b are shown in table 12 as follows. Coefficients of the surface on the exit side (specific surface) of the scanning lens 106b are shown in table 13 as follows. Furthermore, coefficients of the surface on the entrance side (specific surface) of the image-plane-side scanning lens 108a are shown in table 14 as follows. Coefficients of the surface on the exit side (specific surface) of the image-plane-side scanning lens 108a are shown in table 15 as follows.

TABLE 12

| Coefficients in main scanning direction | | Coefficients in sub-scanning direction | |
|---|---|---|---|
| K | 0.000000+00 | $B_1$ | 0 |
| $A_4$ | $-3.87482 \times 10^{-7}$ | $B_2$ | 0 |
| $A_6$ | $6.88714 \times 10^{-10}$ | $B_3$ | 0 |
| $A_8$ | $-3.02912 \times 10^{-13}$ | $B_4$ | 0 |
| $A_{10}$ | $-1.381964 \times 10^{-16}$ | $B_5$ | 0 |
| $A_{12}$ | $4.973160 \times 10^{-20}$ | $B_6$ | 0 |
| — | | $B_7$ | 0 |
| — | | $B_8$ | 0 |

TABLE 13

| Coefficients in main scanning direction | | Coefficients in sub-scanning direction | |
|---|---|---|---|
| K | 0.000000+00 | $B_1$ | $6.44465 \times 10^{-6}$ |
| $A_4$ | $1.46716 \times 10^{-7}$ | $B_2$ | $-2.76702 \times 10^{-6}$ |
| $A_6$ | $2.24364 \times 10^{-10}$ | $B_3$ | $-1.17939 \times 10^{-8}$ |
| $A_8$ | $-1.24578 \times 10^{-14}$ | $B_4$ | $-7.27004 \times 10^{-9}$ |
| $A_{10}$ | $5.54989 \times 10^{-18}$ | $B_5$ | $3.89316 \times 10^{-11}$ |
| $A_{12}$ | $-8.15818 \times 10^{-20}$ | $B_6$ | $-5.12653 \times 10^{-12}$ |
| — | | $B_7$ | $-3.86625 \times 10^{-14}$ |
| — | | $B_8$ | $1.12285 \cdot 10^{-14}$ |

TABLE 14

| Coefficients in main scanning direction | | Coefficients in sub-scanning direction | |
|---|---|---|---|
| K | 0.000000+00 | $B_1$ | $4.98759 \times 10^{-7}$ |
| $A_4$ | $9.47707 \times 10^{-8}$ | $B_2$ | $-9.40784 \times 10^{-7}$ |
| $A_6$ | $-7.06270 \times 10^{-12}$ | $B_3$ | $5.11005 \times 10^{-11}$ |
| $A_8$ | $1.70056 \times 10^{-16}$ | $B_4$ | $7.50683 \times 10^{-11}$ |
| $A_{10}$ | $-6.11408 \times 10^{-20}$ | $B_5$ | $-5.15221 \times 10^{-15}$ |
| $A_{12}$ | $3.00776 \times 10^{-24}$ | $B_6$ | $-4.81012 \times 10^{-15}$ |
| — | | $B_7$ | $-1.46189 \times 10^{-19}$ |
| — | | $B_8$ | $7.21434 \cdot 10^{-19}$ |
| — | | $B_9$ | $2.22208 \times 10^{-23}$ |
| — | | $B_{10}$ | $-2.53749 \cdot 10^{-23}$ |

TABLE 15

| Coefficients in main scanning direction | | Coefficients in sub-scanning direction | |
|---|---|---|---|
| K | 0.000000+00 | $B_1$ | 0 |
| $A_4$ | $-5.56255 \times 10^{-8}$ | $B_2$ | $2.09875 \times 10^{-7}$ |
| $A_6$ | $5.42541 \times 10^{-12}$ | $B_3$ | 0 |
| $A_8$ | $-6.15064 \times 10^{-16}$ | $B_4$ | 0 |
| $A_{10}$ | $-2.44542 \times 10^{-20}$ | $B_5$ | 0 |
| $A_{12}$ | $1.76451 \times 10^{-24}$ | $B_6$ | 0 |
| — | | $B_7$ | 0 |
| — | | $B_8$ | 0 |

The components of the optical system (first optical system) upstream of the deflector of the optical scanning device shown in FIG. 11 are as follows. The optical elements of the optical system upstream of the deflector (first optical system) are appropriately arranged so that positions of image formation in the main scanning/sub-scanning of the entire optical system are near the surface to be scanned.

Light Source:

The light source units 101b and 101c as the semiconductor lasers have a light emission wavelength in design of 655 nanometers, and if the temperature rises 1° C. from the reference temperature of 25° C., the light emission wavelength shifts to the long wavelength side by 0.20 nanometer. As for the mode hopping, it is assumed that the wavelength change is 0.8 nanometer as explained above. Two semiconductor lasers each having one light emitting point are provided in this case. However, a semiconductor laser array having a plurality of light emitting points may be used, or a VCSEL array may also be used.

Coupling Lens:

The coupling lenses 102b and 102c as the first lens are glass-made lens as explained above, and are disposed so that each lens has a focal length of 15 millimeters and has a function of converting the light beam to substantially parallel light beam. The aspheric surface is used for both surfaces of each of the coupling lenses 102b and 102c, so that the aspheric surfaces satisfactorily correct the wavefront aberration of respective coupled light beams although aspheric surface coefficients are not disclosed.

The light source unit 101b and the coupling lens 102b (the light source unit 101c and the coupling lens 102c) are fixedly held by a holding element made of a material having a linear expansion coefficient of 2.3×10−5. The coupling lenses are made of glass, and have the refractive index of the glass 2 in the table 10.

Aperture:

The aperture 103b is a rectangular aperture with an aperture diameter in the main scanning direction of 5.4 millimeters and an aperture diameter in the sub-scanning direction of 2.28 millimeters, and shapes the light beams coupled respectively by the coupling lenses 102b and 102c. In this case, as shown in FIG. 13, the shielding element 119 is arranged between the light source and the coupling lens, and the shielding element 120 is arranged between the anamorphic lens (second lens) 104b and the polygon mirror 105b.

Anamorphic Lens:

The anamorphic lens 104b is obtained by forming the surface on its entrance side with a cylindrical surface having the power only in the sub-scanning direction and forming the surface on its exit side with a step-shaped diffractive surface having elliptical diffraction grooves.

A curvature radius of the entrance surface in the sub-scanning direction is 63.4 millimeters. The exit surface (second surface) is a diffractive surface, and a phase function $\phi(y, z)$ of the diffractive surface is expressed by the following equation:

$$\phi(y,z) = C1 \cdot Y2 + C2 \cdot Z2$$

$$C1 = -0.0006199, \quad C2 = -0.007537$$

The diffractive surface is formed on a toroidal surface having a curvature radius in the main scanning direction of 425.4 millimeters and a curvature radius in the sub-scanning direction of 35 millimeters, where the step-shaped diffractive surface having elliptical diffraction grooves is formed.

At the same time, P1=−P2 in both the main and sub-scanning directions, and a finished diffractive surface is the step shape. In other words, the power of the second surface becomes non-power in both the main and sub-scanning directions.

Optical Deflector:

The polygon mirror 105b of the optical deflector is as follows: the number of reflection facets is 4, and a radius of an inscribed circle is 7 millimeters. The soundproof glass G3 is made of the glass 2 in the table 10 and has a thickness of 1.9 millimeters, and a tilt angle α thereof from the y direction (vertical direction of FIG. 11) is 16 degrees.

An angle θ is 60.55 degrees. More specifically, the angle is formed by a traveling direction of the light beam incident from the light source side and by a traveling direction of the light beam reflected on the deflection/reflection facet toward a position where an image height on the surface 107b (image plane) is 0.

Changes in the beam waist positions in the main and sub-scanning directions of the optical scanning device according to the second embodiment are as shown in table 16 as follows. It is obvious that the changes in the beam waist positions are respectively reduced by the effect of the diffractive surface of the anamorphic lens 104b.

TABLE 16

Changes in beam waist positions

|  | Wavelength hopping | Temperature variation |
|---|---|---|
| Main scanning direction | 0.11μμ | 0.04μμ |
| Sub-scanning direction | 0.18μμ | 0.16μμ |

Figure 15:
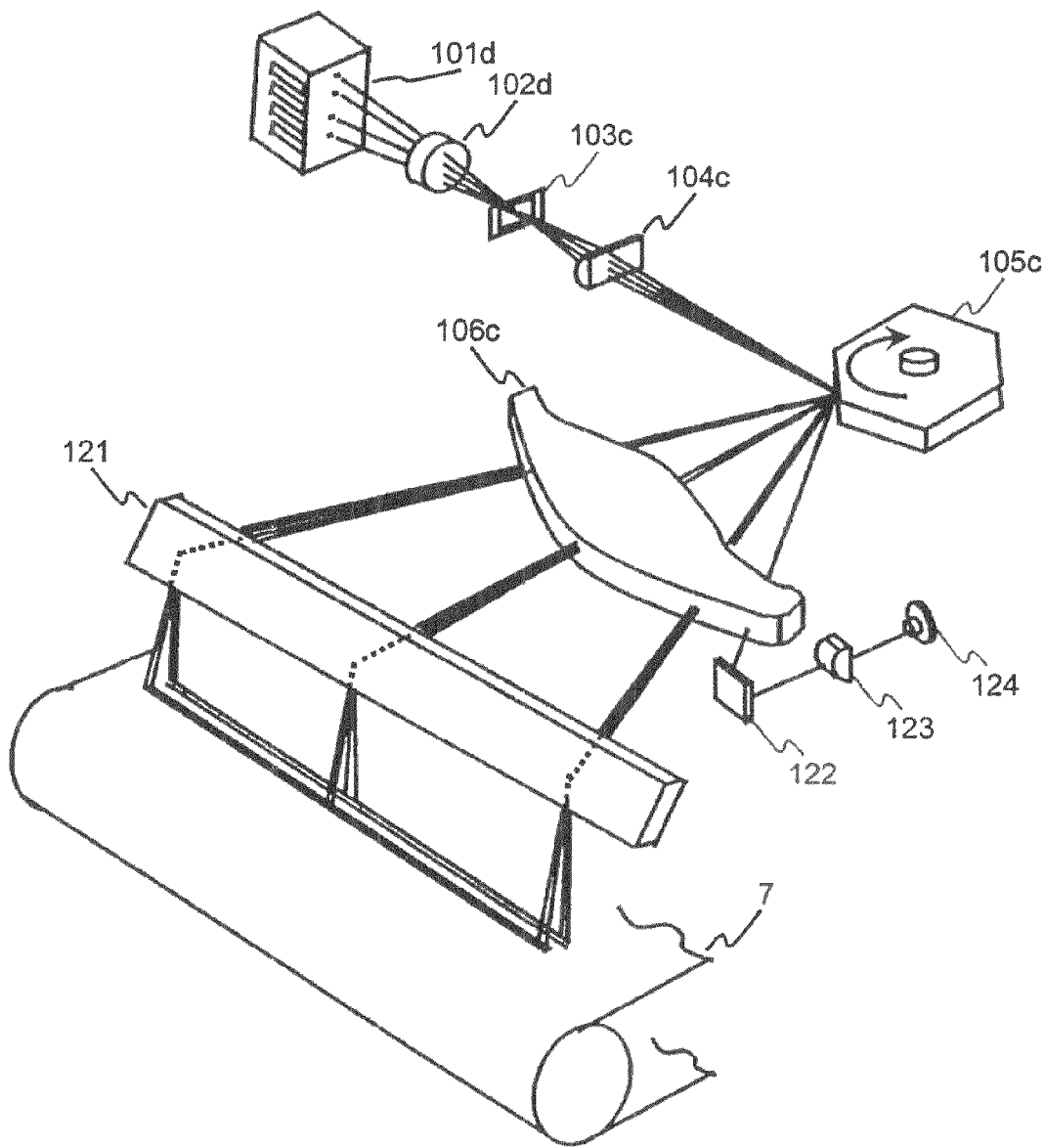
FIG. 15 is a schematic perspective view of an optical scanning device according to a third embodiment of the present invention.

An optical scanning device, an optical writing device, and an image forming apparatus according to a third embodiment of the present invention are explained below. FIG. 15 is a schematic perspective view of the optical scanning device according to the third embodiment. A plurality of light fluxes emitted from a light source unit 101d formed with semiconductor lasers is coupled by a coupling lens 102d to an optical system located downstream of the coupling lens 102d. In the following explanation, a light source has a single light emitting point for simplification. However, even if the light source has a plurality of light emitting points, the same functional effect according to the third embodiment is also obtained.

The light fluxes transmit the coupling lens 102d and further pass through an opening of an aperture 103c, where each peripheral portion of the light fluxes is thereby shielded to shape each cross section, and the shaped light fluxes enter an anamorphic lens 104c which is a linear-image imaging optical system. The anamorphic lens 104c is disposed based on determination of its orientation so that the anamorphic lens 104c has no power in the main scanning direction and has a positive power in the sub-scanning direction. The anamorphic lens 104c is also configured so as to converge incoming light fluxes only in the sub-scanning direction and collect the light fluxes, as a long linear image in the main scanning direction, near the deflection/reflection facet of a polygon mirror 105c which is the optical deflector. The anamorphic lens 104c has a diffractive surface on its exit surface (second surface).

The light fluxes reflected by the deflection/reflection facet transmit a scanning lens 106c that forms a scanning optical system while deflecting at an equiangular speed in accordance with a rotation of the polygon mirror 105c at a constant speed. A light path is bent by a bending mirror 121 for guiding the light fluxes to the surface to be scanned, and the bent light fluxes are collected, as a light spot, on an optically conductive photosensitive element 7 which is substantially the surface to be scanned, to optically scan the surface to be scanned.

Although the scanning optical system in FIG. 15 is formed with only one scanning lens 106c, even if a plurality of scanning lenses are used, the same effect of the third embodiment is obtained. A deflected light flux is reflected by a synchronization mirror 122 before optical scanning each time the deflected light fluxes optically scan the photosensitive element 7, and the reflected light is collected to a synchronization detector 124 in the main scanning direction by a synchronization lens 123. The synchronization detector 124 receives the reflected light to output a detection signal, and a write-start timing for optical scanning is determined based on the output signal.

The "spot diameter of a light spot" in this specification is defined as $1/e^2$ intensity in a line spread function of a light intensity distribution in the light spot on the surface to be scanned. The "line spread function" is defined as follows. When a light intensity distribution of a light spot f(Y, Z) is defined using coordinates Y and Z in the main and sub-scanning directions based on the central coordinate of the light spot formed on the surface to be scanned as reference, a line spread function LSZ in the Z direction is defined as $LSZ(Z)=\int f(Y, Z)dY$ (integration is performed on the full length of the light spot in the Y direction), and a line spread function LSY in the Y direction is defined as $LSY(Y)=\int f(Y, Z)dZ$ (integration is performed on the full length of the light spot in the Z direction).

These line spread functions LSZ(Z) and LSY(Y) are usually the shape of a substantially gauss distribution type, and spot diameters in the Y direction and the Z direction are given by a width in the Y direction and a width in the Z direction in areas in which the line spread functions LSZ(Z) and LSY(Y) are $1/e^2$ or more of their respective maximum values. The spot diameters thus defined by using the line spread functions can be easily measured by optically scanning the light spot with a slit at a constant speed, receiving the light having passed through the slit by a light detector, and integrating the amount of received light. A measurement device for this is commercially available.

Data for a glass material (called "glass 3") and a resin material (called "resin 3") used in the third embodiment are shown in table 17.

TABLE 17

Material data (wavelength: 655 nm)

|  | Median | Wavelength hopping | Temperature variation | Linear expansion coefficient |
|---|---|---|---|---|
| Glass 3 | 1.515141 | 1.515116 | 1.515062 | $7.5 \times 10^{-6}$ |
| Resin 3 | 1.527257 | 1.527229 | 1.525368 | $7.0 \times 10^{-5}$ |

In the material data shown in the table 17, "median" is a refractive index for a wavelength to be used at a reference temperature of 25° C., "wavelength hopping" is a refractive index when wavelength hopping occurs caused by mode hopping, and "temperature variation" is a refractive index when the temperature rises 20 degrees from the reference temperature. For the "wavelength hopping" due to mode hopping, it is assumed that a wavelength change is 0.8 nanometer, allowing for unexpected change.

Data for the optical system located downstream of the optical deflector according to the third embodiment is given to data for an optical system located downstream of the optical deflector in table 18.

TABLE 18

Data for optical system downstream of optical deflector

|  | $R_m$ | $R_s$ | $D_x$ | $D_y$ | n |
|---|---|---|---|---|---|
| Optical deflector (Rotating axis) | — | — | 43.3 | 2.9 | — |
| Scanning lens6-1 | −110.142 | −472.788 | 8 | 0 | Resin 2 |
| Scanning lens6-2 | −57.939 | −500. | 101.1 |  |  |

TABLE 18-continued

Data for optical system downstream of optical deflector

|  | $R_m$ | $R_s$ | $D_x$ | $D_y$ | n |
|---|---|---|---|---|---|
| Scanning lens7-1 | −5000. | 93.8 | 3 | 0 | Resin 2 |
| Scanning lens7-2 | 724.16 | −60.71 | 139.9 | | |
| Surface to be scanned | — | — | — | — | — |

Figure 16:
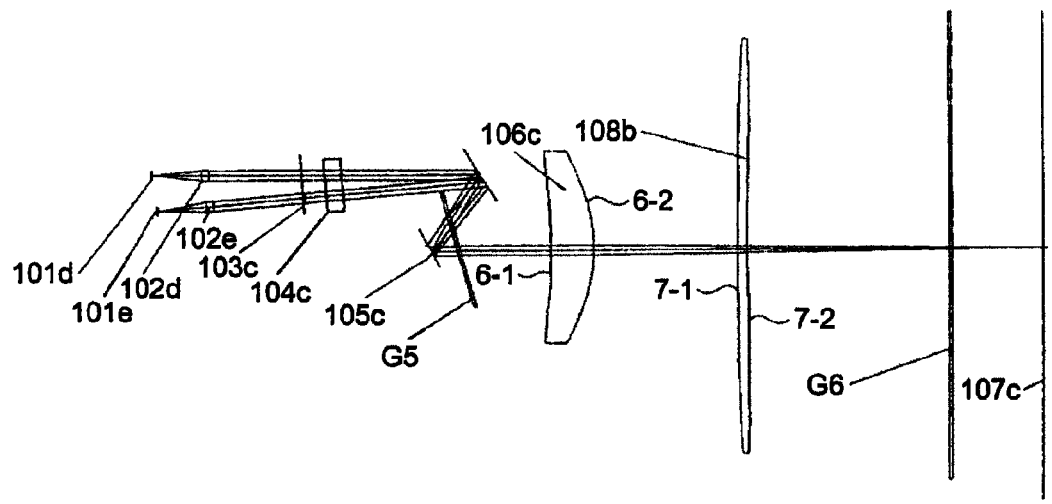
FIG. 16 is a schematic diagram of an optical system of the optical scanning device shown in FIG. 15.

In the table 18, Rm represents a paraxial curvature in the main scanning direction, Rs represents a paraxial curvature in the sub-scanning direction, Dx and Dy represent a relative distance from an origin of each optical element to an origin of a next optical element, and n represents a material to be used. Unit is millimeter (mm). As shown in FIG. 16, a scanning lens 6-1 is a first surface (entrance surface) of the scanning lens 106c and a scanning lens 6-2 is a second surface (exit surface) thereof, and a scanning lens 7-1 is a first surface (entrance surface) of an image-plane-side scanning lens 108b and a scanning lens 7-2 is a second surface (exit surface) thereof.

For example, referring to Dx and Dy with respect to the optical deflector, when viewed from the rotational axis of the polygon mirror 105c which is the optical deflector, the origin of the entrance surface of the scanning lens 106c (position of the optical axis on the surface of its entrance side) is 43.3 millimeters away from the optical deflector in the optical axis direction (x direction, horizontal direction in FIG. 16), and is 2.9 millimeters away therefrom in the main scanning direction (y direction, vertical direction in FIG. 16).

A dustproof glass G6 made of the glass 3 with a thickness of 1.9 millimeters is arranged between the image-plane-side scanning lens 108b and a surface 107c to be scanned, as shown in FIG. 16. The surfaces of the scanning lens 106c and the image-plane-side scanning lens 108b are aspherical surfaces, which are specific surfaces, all of which are non-circular arcs given by equation (9) as follows in the main scanning direction, and in which the curvature in a sub-scanning cross section (virtual cross section parallel to the optical axis and the sub-scanning direction) changes according to equation (10) as follows in the main scanning direction.

Non-Circular Arc:

This is expressed by equation (9) as follows:

$$X = \frac{Y^2/R_m}{1+\sqrt{1-(1+K_m)\cdot(Y/R_m)^2}} + A_1 \cdot Y + A_2 \cdot Y^2 + A_3 \cdot Y^3 + A_4 \cdot Y^4 + A_5 \cdot Y^5 + A_6 \cdot Y^6 \ldots \quad (9)$$

where Rm is a paraxial curvature radius in a main-scanning cross section, Y is a distance from the optical axis in the main scanning direction; K is a conical constant, A1, A2, A3, A4, A5, . . . are high-order coefficients, and X is a depth in the optical axis direction.

Change in Curvature in Sub-Scanning Cross Section:

An equation expressing how a curvature Cs(Y)(Y: coordinate in the main scanning direction based on the position of the optical axis as the origin) in the sub-scanning cross section changes in the main scanning direction is as shown in equation (10) as follows:

$$C_s(Y) = 1/R_s(0) + B_1 \cdot Y + B_2 \cdot Y^2 + B_3 \cdot Y^3 + B_4 \cdot Y^4 + B_5 \cdot Y^5 + B_6 \cdot Y^6 + \ldots \quad (10)$$

where Rs (0) is a curvature radius in the sub-scanning cross section including the optical axis, and B1, B2, B3, . . . are coefficients.

Coefficients of the surface (specific surface) on the entrance side of the scanning lens 106c are shown in table 19.

TABLE 19

| Coefficients in main scanning direction | | Coefficients in sub- scanning direction | |
|---|---|---|---|
| K | 0.000000+00 | $B_1$ | 0 |
| $A_4$ | −3.87482 × $10^{-7}$ | $B_2$ | 0 |
| $A_6$ | 6.88714 × $10^{-10}$ | $B_3$ | 0 |
| $A_8$ | −3.02912 × $10^{-13}$ | $B_4$ | 0 |
| $A_{10}$ | −1.381964 × $10^{-16}$ | $B_5$ | 0 |
| $A_{12}$ | 4.973160 × $10^{-20}$ | $B_6$ | 0 |
| | — | $B_7$ | 0 |
| | — | $B_8$ | 0 |

Coefficients of the surface (specific surface) on the exit side of the scanning lens 106c are shown in table 20.

TABLE 20

| Coefficients in main scanning direction | | Coefficients in sub- scanning direction | |
|---|---|---|---|
| K | 0.000000+00 | $B_1$ | 6.44465 × $10^{-6}$ |
| $A_4$ | 1.46716 × $10^{-7}$ | $B_2$ | −2.76702 × $10^{-6}$ |
| $A_6$ | 2.24364 × $10^{-10}$ | $B_3$ | −1.17939 × $10^{-8}$ |
| $A_8$ | −1.24578 × $10^{-14}$ | $B_4$ | −7.27004 × $10^{-9}$ |
| $A_{10}$ | 5.54989 × $10^{-18}$ | $B_5$ | 3.89316 × $10^{-11}$ |
| $A_{12}$ | −8.15818 × $10^{-20}$ | $B_6$ | −5.12653 × $10^{-12}$ |
| | — | $B_7$ | −3.86625 × $10^{-14}$ |
| | — | $B_8$ | 1.12285 · $10^{-14}$ |

Coefficients of the surface (specific surface) on the entrance side of the image-plane-side scanning lens 108b are shown in table 21.

TABLE 21

| Coefficients in main scanning direction | | Coefficients in sub- scanning direction | |
|---|---|---|---|
| K | 0.000000+00 | $B_1$ | 4.98759 × $10^{-7}$ |
| $A_4$ | 9.47700 × $10^{-8}$ | $B_2$ | −9.40784 × $10^{-4}$ |
| $A_6$ | −7.06270 × $10^{-12}$ | $B_3$ | 5.11005 × $10^{-11}$ |
| $A_8$ | 1.70056 × $10^{-16}$ | $B_4$ | 7.50683 × $10^{-11}$ |
| $A_{10}$ | −6.11408 × $10^{-20}$ | $B_5$ | −5.15221 × $10^{-15}$ |
| $A_{12}$ | 3.00776 × $10^{-24}$ | $B_6$ | −4.81015 × $10^{-15}$ |
| | — | $B_7$ | −1.46189 × $10^{-19}$ |
| | — | $B_8$ | 7.21434 · $10^{-19}$ |
| | — | $B_9$ | 2.22208 × $10^{-23}$ |
| | — | $B_{10}$ | −2.53749 · $10^{-23}$ |

Coefficients of the surface (specific surface) on the exit side of the image-plane-side scanning lens 108b are shown in table 22.

TABLE 22

| Coefficients in main scanning direction | | Coefficients in sub- scanning direction | |
|---|---|---|---|
| K | 0.000000+00 | $B_1$ | 0 |
| $A_4$ | −5.56255 × $10^{-8}$ | $B_2$ | 2.09875 × $10^{-7}$ |
| $A_6$ | 5.42541 × $10^{-12}$ | $B_3$ | 0 |
| $A_8$ | −6.15064 × $10^{-16}$ | $B_4$ | 0 |
| $A_{10}$ | −2.44542 × $10^{-20}$ | $B_5$ | 0 |
| $A_{12}$ | 1.76451 × $10^{-24}$ | $B_6$ | 0 |
| | — | $B_7$ | 0 |
| | — | $B_8$ | 0 |

A specific configuration of the components of the optical system is as follows. The optical elements of the optical system upstream of the deflector are appropriately arranged so that positions of image formation in the main scanning/sub-scanning direction of the entire optical system are near the surface to be scanned.

Figure 17:
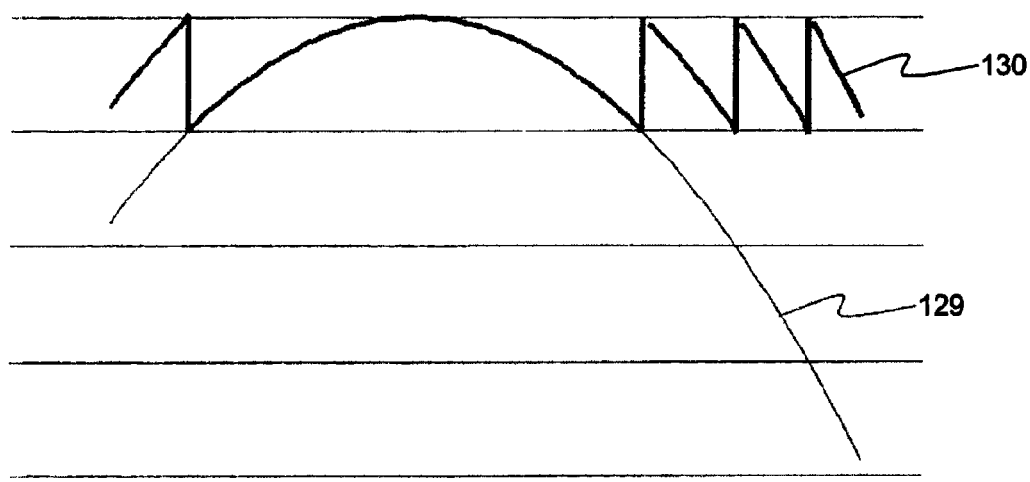
FIG. 17 is a cross section of an anamorphic lens of the optical scanning device shown in FIG. 15.

The shape of the cross section of the anamorphic lens 104c is formed with a circular arc and a diffraction shape. FIG. 17 is a cross section of the anamorphic lens for the optical scanning device according to the third embodiment. Each of coupling lenses 102d and 102e and the anamorphic lens 104c is formed with a circular arc portion 129 and a diffraction shape portion 130.

Light Source:

Light source units 101d and 101e which use the semiconductor lasers have a light emission wavelength in design of 655 nanometers, and if the temperature rises 1° C. from the reference temperature of 25° C., the light emission wavelength shifts to the long wavelength side by 0.20 nanometer. As for the mode hopping, it is assumed that the wavelength change is 0.8 nanometer as explained above. Two semiconductor lasers each having one light emitting point are provided in this case. However, a semiconductor laser array may be used, or a VCSEL may also be used.

Coupling Lens:

The coupling lenses 102d and 102e are the glass-made lenses as explained above, and are disposed so that each lens has a focal length of 15 millimeters and has a function of converting the light flux from the light source to a substantially parallel light flux. The aspheric surface is used for both surfaces of the coupling lens 102d and 102e, so that the aspheric surfaces satisfactorily correct the wavefront aberration of respective coupled light fluxes although aspheric surface coefficients are not disclosed. The light source unit 101d (or 101e) and the coupling lens 102d (or 102e) are fixedly held by a holding element made of a material having a linear expansion coefficient of 2.3×10−5. The material of the coupling lenses is glass which has the refractive index as described in the material data of the table 10.

Figure 20:
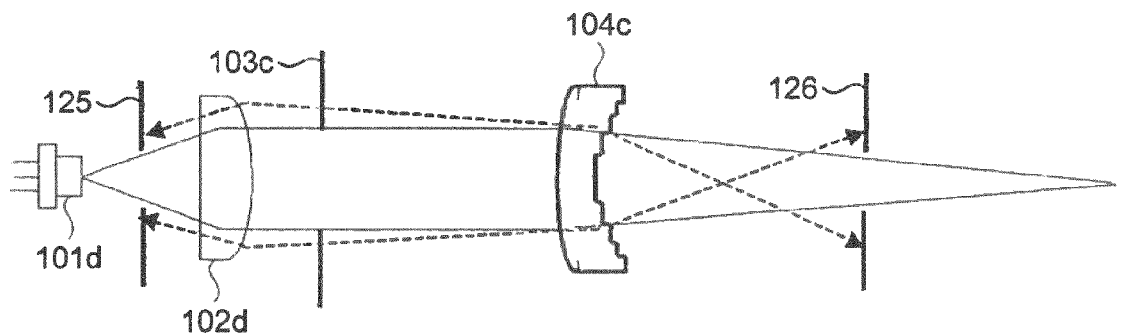
FIG. 20 is a schematic diagram of an optical system in which a plurality of shielding elements is provided in the optical scanning device shown in FIG. 15.

Aperture:

The aperture 103c is a rectangular aperture with an aperture diameter in the main scanning direction of 5.4 millimeters and an aperture diameter in the sub-scanning direction of 2.28 millimeters, and beam-shapes the light fluxes coupled respectively by the coupling lenses 102d and 102e. FIG. 20 is a schematic diagram of an optical system in which a plurality of shielding elements is provided in the optical scanning device according to the third embodiment. In this case, a shielding element 125 is arranged between the light source 101d and the coupling lens 102d, and a shielding element 126 is arranged between the anamorphic lens 104c and the polygon mirror 105c.

Anamorphic Lens:

The anamorphic lens 104c is obtained by forming the surface on its entrance side with a cylindrical surface having the power only in the sub-scanning direction and forming the surface on its exit side with a step-shaped diffractive surface having elliptical diffraction grooves. A curvature radius of the entrance surface in the sub-scanning direction is 63.4 millimeters. The exit surface is the diffractive surface, so that a divergent light, a reflected light, and a diffracted light of an unnecessary diffraction order are prevented from returning to the light source. A phase function $\phi(y, z)$ of the diffractive surface is expressed by the following equation:

$$\phi(y,z)=C1 \cdot Y2+C2 \cdot Z2$$

$C1=-0.0006199, C2=-0.007537$

Figure 18:
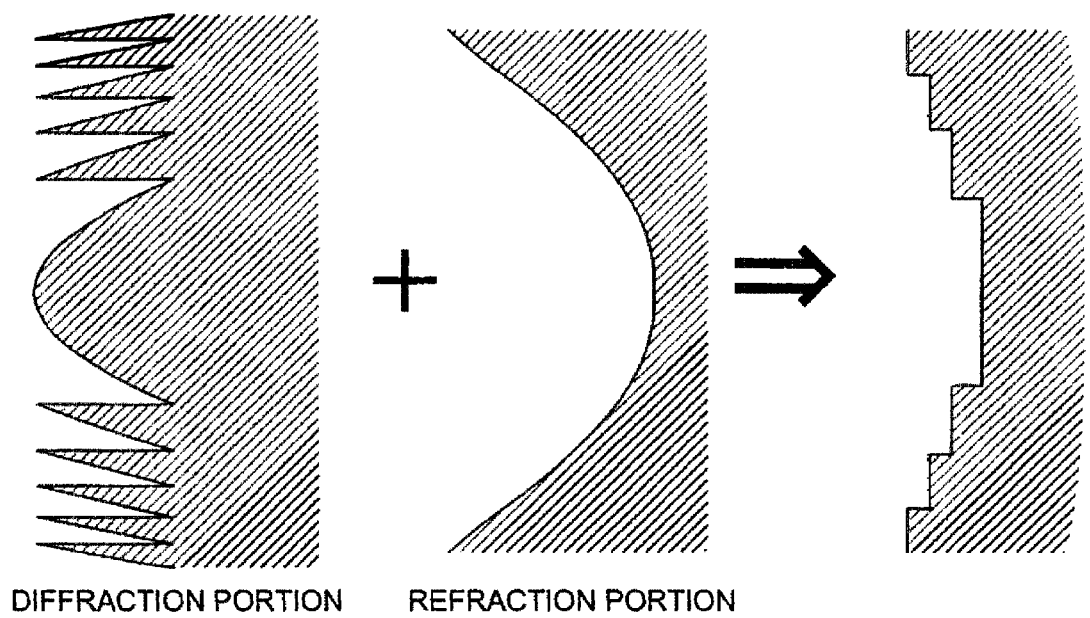
FIG. 18 is a model of the shape of a diffractive surface when the shape is set so that the power of a diffractive portion and the power of a refractive portion of an optical element cancel each other according to the third embodiment.

The diffractive surface is formed on a toroidal surface having a curvature radius in the main scanning direction of 425.4 millimeters and a curvature radius in the sub-scanning direction of 35 millimeters, and the step-shaped diffractive surface having elliptical diffraction grooves is formed on the second surface (exit surface). FIG. 18 is a model of the shape of the diffractive surface when the shape is set so that the power of a diffractive portion and the power of a refractive portion in the optical element according to the third embodiment cancel each other. At this time, P1=−P2 (P1: power of the refractive portion, P2: power of the diffractive portion) in both the main and sub-scanning directions, and a finished diffractive surface is a step shape, i.e., a multi-step type as shown in FIG. 18.

Figure 19A:
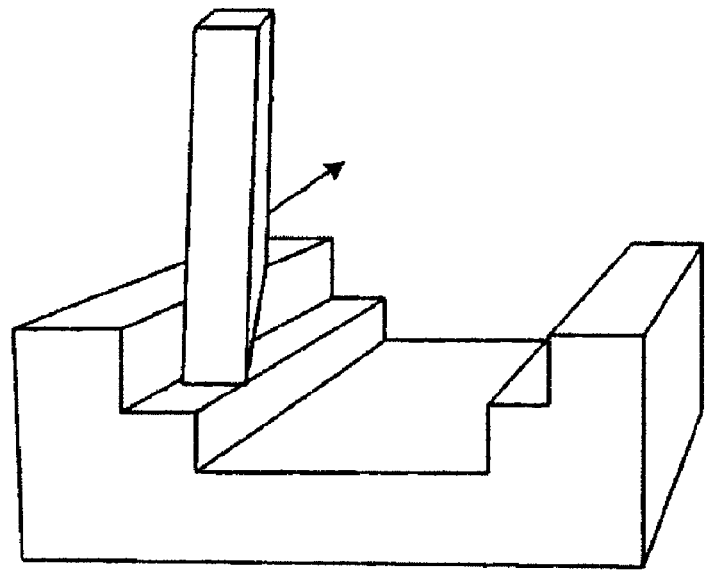
FIG. 19A is an enlarged view of a main portion of the diffractive surface representing how the diffractive surface of the optical element is machined according to the third embodiment.
Figure 19B:
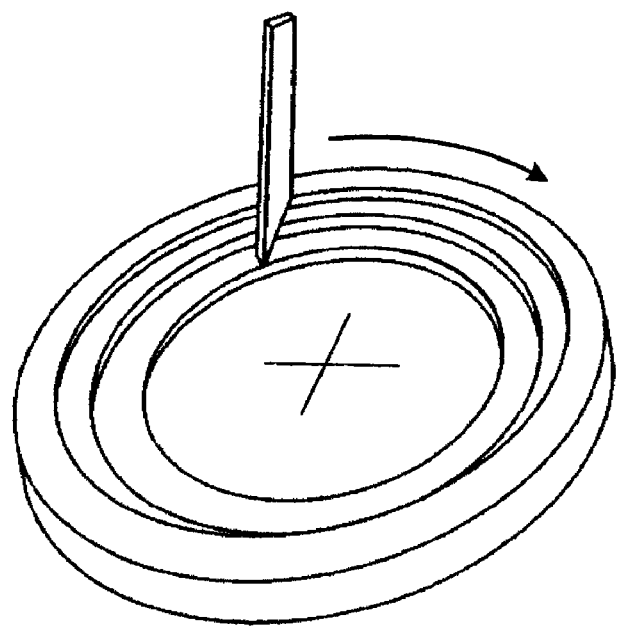
FIG. 19B is a schematic diagram for explaining how the diffractive surface is machined.

In other words, the power of the second surface becomes non-power in both the main and sub-scanning directions. If the diffractive surface is provided on the side of the entrance surface, then the diffractive surface has a plane perpendicular to the optical axis. Therefore, a strong reflection is caused to occur in a light-flux diffractive portion of an incident light, and the reflected light returns to the semiconductor laser along the light path in the reverse direction, which causes interference. Alternatively, the reflected light enters the other semiconductor laser to cause interference. From these reasons, it is preferable to set the step-shaped diffractive surface on the side of the exit surface. FIG. 19A is an enlarged view of a main portion of the diffractive surface representing how the diffractive surface of the optical element according to the third embodiment is machined, and FIG. 19B is a schematic diagram for explaining how the diffractive surface is machined.

Optical Deflector:

A polygon mirror 105d (see FIG. 21) which is the optical deflector is as follows: the number of reflection facets is 4, and a radius of an inscribed circle is 7 millimeters.

A soundproof glass G5 is made of the glass 3 and has a thickness of 1.9 millimeters, and a tilt angle α thereof from the y direction (vertical direction of FIG. 16) is 16 degrees. An angle θ is 60.55 degrees. More specifically, the angle is formed by a traveling direction of the light flux incident from the light source side and by a traveling direction of the light flux reflected by the deflection/reflection facet toward a position where an image height on the surface 107c is 0.

Changes in the beam waist positions in the main and sub-scanning directions according to the third embodiment are as shown in table 23.

TABLE 23

|  | Wavelength hopping | Temperature variation |
| --- | --- | --- |
| Main scanning direction | 0.11μμ | 0.04μμ |
| Sub-scanning direction | 0.18μμ | 0.16μμ |

It is obvious that the changes in the beam waist positions are respectively reduced by the effect of the diffractive surface.

In the following, a modification of the third embodiment is explained. Data for a glass material (called "glass 4") and a resin material (called "resin 4") used in the modification of the third embodiment are as shown in material data (wavelength: 780 nm) of table 24. The format is based on the first embodiment.

TABLE 24

| Material data (wavelength: 780 nm) | | | | |
| --- | --- | --- | --- | --- |
|  | Median | Wavelength hopping | Temperature variation | Linear expansion coefficient |
| Glass 4 | 1.511187 | 1.511171 | 1.511130 | $7.5 \times 10^{-6}$ |
| Resin 4 | 1.523961 | 1.523946 | 1.522118 | $7.0 \times 10^{-5}$ |

Data for an optical system shown in table 25 as follows is given as data for the optical system located downstream of the optical deflector according to the modification of the third embodiment. The optical system for the optical scanning device according to the modification of the third embodiment uses an oblique incidence method in which a light flux obliquely enters the optical deflector at an angle of 3.3 degrees in the sub-scanning cross section. A plurality of light fluxes deflected by the optical deflector enters each shared scanning lens at an angle with respect to the main-scanning cross section, to form images on surfaces to be scanned by the image-plane-side scanning lens which has light paths for the light fluxes as the optical axes in the sub-scanning direction.

In other words, the image-plane-side scanning lens has the optical axis in the sub-scanning direction at an angle with respect to the main-scanning cross section. As shown in FIG. 16, the scanning lens includes the scanning lens 106c and the image-plane-side scanning lens 108b, and the dustproof glass G6 made of the glass 4 with a thickness of 1.9 millimeters is arranged between the image-plane-side scanning lens 108b and the surface 107c.

TABLE 25

Data for optical system downstream of optical deflector

| | $R_m$ | $R_s$ | X | Z | n | Remark |
|---|---|---|---|---|---|---|
| Deflection surface | ∞ | ∞ | | | — | Deflection surface |
| 1 | −75.277 | ∞ | 5.00 | 0 | 1.5240 | First scanning/imaging lens |
| 2 | −48.694 | ∞ | 160.90 | | — | |
| 3 | −3690.000 | 34.665 | (3.00)* | (0.00)* | 1.5240 | Second scanning/imaging lens |
| 4 | 1138.620 | ∞ | 97.58 | | — | |
| 5 | — | — | — | — | — | Surface to be scanned |

*Parenthetic values in X and Z are values related to the image-plane-side scanning lens 108b.

Specific Tilt/Deflection Surface:

The exit surface of the image-plane-side scanning lens 108b has no curvature in the sub-scanning direction, and has a surface shape so as to be expressed by equation (11), which indicates a tilt angle thereof in the sub-scanning cross section is changed along the main scanning direction. In the specification, the surface shape is called "specific tilt/deflection surface" as a particular case of the "specific surface". As one of means of forming an excellent image using the oblique incidence method is to introduce the specific tilt/deflection surface.

$$X = \frac{Y^2/R_m}{1 + \sqrt{1 - (1+K_m) \cdot (Y/R_m)^2}} + A_1 \cdot Y + A_2 \cdot Y^2 + A_3 \cdot Y^3 + A_4 \cdot Y^4 + A_5 \cdot Y^5 + A_6 \cdot Y^6 \ldots + [F_1 \cdot Y + F_2 \cdot Y^2 + F_3 \cdot Y^3 + F_4 \cdot Y^4 + F_5 \cdot Y^5 + F_6 \cdot Y^6 \ldots] [Z - Z_0(Y)] \quad (11)$$

Coefficients of the surface on the entrance side of the scanning lens 106c are shown in table 26.

TABLE 26

| Coefficients in main scanning direction | | Coefficients in sub-scanning direction | |
|---|---|---|---|
| K | 0.000E+00 | $B_2$ | −6.905E−06 |
| $A_4$ | −3.800E−07 | $B_4$ | 5.491E−09 |
| $A_6$ | −2.163E−11 | $B_6$ | 2.701E−11 |
| $A_8$ | −6.220E−13 | $B_8$ | −5.370E−14 |
| $A_{10}$ | −4.213E−15 | $B_{10}$ | −1.150E−16 |
| $A_{12}$ | 6.030E−18 | $B_{12}$ | 1.029E−19 |

Coefficients of the surface on the exit side of the scanning lens 106c are shown in table 27.

TABLE 27

| Coefficients in main scanning direction | | Coefficients in sub-scanning direction | |
|---|---|---|---|
| K | 0.000E+00 | $B_2$ | 4.896E−06 |
| $A_4$ | −7.532E−08 | $B_4$ | −6.935E−10 |
| $A_6$ | −2.355E−10 | $B_6$ | −8.992E−12 |
| $A_8$ | 8.753E−13 | $B_8$ | −4.362E−15 |
| $A_{10}$ | −6.509E−15 | $B_{10}$ | 5.5550E−17 |
| $A_{12}$ | 6.213E−18 | $B_{12}$ | 3.132E−20 |

Coefficients of the surface on the entrance side of the image-plane-side scanning lens 108b are shown in table 28.

TABLE 28

| Coefficients in main scanning direction | | Coefficients in sub-scanning direction | |
|---|---|---|---|
| K | 0.000E+00 | $B_1$ | −7.642E−08 |
| $A_4$ | −5.98E−08 | $B_2$ | −4.305E−07 |
| $A_6$ | −1.46E−11 | $B_3$ | 1.253E−10 |
| $A_8$ | 4.1E−15 | $B_4$ | 6.534E−12 |
| $A_{10}$ | −1.75E−19 | $B_5$ | −6.547E−15 |
| $A_{12}$ | −4.95E−24 | $B_6$ | −3.888E−14 |
| — | — | $B_7$ | — |
| — | — | $B_8$ | 2.171E−17 |
| — | — | $B_9$ | — |
| — | — | $B_{10}$ | −4.104E−21 |
| — | — | $B_{11}$ | — |
| — | — | $B_{12}$ | 2.522E−25 |
| — | — | $F_1$ | — |
| — | — | $F_2$ | — |
| — | — | $F_3$ | — |
| — | — | $F_4$ | — |
| — | — | $F_5$ | — |
| — | — | $F_6$ | — |
| — | — | $F_7$ | — |
| — | — | $F_8$ | — |
| — | — | $F_9$ | — |
| — | — | $F_{10}$ | — |

Coefficients of the surface on the exit side of the image-plane-side scanning lens 108b are shown in table 29.

TABLE 29

| Coefficients in main scanning direction | | Coefficients in sub-scanning direction | |
|---|---|---|---|
| K | 0.000E+00 | $B_1$ | — |
| $A_4$ | −1.315E−07 | $B_2$ | — |
| $A_6$ | −1.024E−11 | $B_3$ | — |
| $A_8$ | 3.132E−15 | $B_4$ | — |
| $A_{10}$ | −6.027E−20 | $B_5$ | — |

TABLE 29-continued

| Coefficients in main scanning direction | | Coefficients in sub-scanning direction | |
|---|---|---|---|
| $A_{12}$ | −9.355E−24 | $B_6$ | — |
| — | | $B_7$ | — |
| — | | $B_8$ | — |
| — | | $B_9$ | — |
| — | | $B_{10}$ | — |
| — | | $B_{11}$ | — |
| — | | $B_{12}$ | — |
| — | | $F_1$ | 9.297E−08 |
| — | | $F_2$ | −9.242E−08 |
| — | | $F_3$ | 6.282E−11 |
| — | | $F_4$ | −4.703E−11 |
| — | | $F_5$ | — |
| — | | $F_6$ | 2.494E−14 |
| — | | $F_7$ | — |
| — | | $F_8$ | −3.783E−13 |
| — | | $F_9$ | — |
| — | | $F_{10}$ | 1.890E−22 |

A specific configuration of the components of the optical system is as follows. The optical elements of the optical system located upstream of the deflector are appropriately arranged so that positions of image formation in the main scanning direction and/or the sub-scanning direction of the entire optical system are near the surface to be scanned.

Light Source:

The light source units 101d and 101e which use the semiconductor lasers have a light emission wavelength in design of 780 nanometers, and if the temperature rises 1° C. from the reference temperature of 25° C., the light emission wavelength shifts to the long wavelength side by 0.25 nanometer. As for the mode hopping, it is assumed that the wavelength change is 0.8 nanometer as explained above. Two semiconductor lasers each having one light emitting point are provided in this case. However, a semiconductor laser array may be used, or a VCSEL may also be used.

Coupling Lens:

The coupling lenses 102d and 102e of the modification of the third embodiment have the same configuration as that of the first and the second embodiments.

Aperture:

The aperture 103c is a rectangular aperture with an aperture diameter in the main scanning direction of 5.0 millimeters and an aperture diameter in the sub-scanning direction of 1.12 millimeters, and beam-shapes a divergent light flux emitted from the light source, to guide the shaped light flux to the anamorphic lens 104c.

Anamorphic Lens:

The anamorphic lens 104c is such that the surface on its entrance side is an anamorphic convex surface and the surface on its exit side is a step-shaped diffractive surface having elliptical diffraction grooves. The diffractive surface is provided on the exit surface, a divergent light, a reflected light, and a diffracted light of an unnecessary diffraction order of the diffractive surface are thereby prevented from returning to the light source.

A curvature radius of the entrance surface in the main scanning direction is 45.8 millimeters, and that in the sub-scanning direction is 28.2 millimeters. A phase function $\phi(y, z)$ of the diffractive surface is expressed by the following equation:

$$\phi(y,z) = C1 \cdot Y2 + C2 \cdot Z2$$

$C1 = -0.00178218$, $C2 = -0.032343272$

The diffractive surface is formed on an anamorphic concave surface having a curvature radius in the main scanning direction of 147 millimeters and a curvature radius in the sub-scanning direction of 8.1 millimeters, where the step-shaped diffractive surface having elliptical diffraction grooves is formed. P1=−P2 (P1: power of the refractive portion, P2: power of the diffractive portion) in both the main and sub-scanning directions, and a finished diffractive surface is a step shape, i.e., a multi-step type.

In other words, the power of the second surface (exit surface) becomes non-power in both the main and sub-scanning directions. If the diffractive surface is provided on the side of the entrance surface, then the diffractive portion has a plane perpendicular to the optical axis. Therefore, a strong reflection is caused to occur in a light-flux diffractive portion of an incident light, and the reflected light may return to the semiconductor laser along the light path in the reverse direction, which causes interference. Alternatively, the reflected light may enter the other semiconductor laser to cause interference. From these reasons, it is preferable to set the step-shaped diffractive surface on the side of the exit surface.

Optical Deflector:

The polygon mirror 105c which is the optical deflector is as follows: the number of reflection facets is 6, and a radius of an inscribed circle is 13 millimeters.

The soundproof glass G5 is made of the glass 4 and has a thickness of 1.9 millimeters, and a tilt angle α thereof from the y direction (vertical direction of FIG. 16) is 8 degrees. An angle θ is 60 degrees. More specifically, the angle is formed by a traveling direction of the light flux incident from the light source side and by a traveling direction of the light flux reflected on the deflection/reflection facet toward a position where an image height on the surface 107c is 0.

Changes in the beam waist positions in the main and sub-scanning directions according to the modification of the third embodiment are as shown in table 30.

TABLE 30

| | Wavelength hopping | Temperature variation |
|---|---|---|
| Main scanning direction | 0.11 μμ | 0.01 μμ |
| Sub-scanning direction | 0.15 μμ | 0.00 μμ |

It is obvious that the changes in the beam waist positions are respectively reduced by the effect of the diffractive surface provided in a single lens upstream of the optical deflector.

Figure 21:
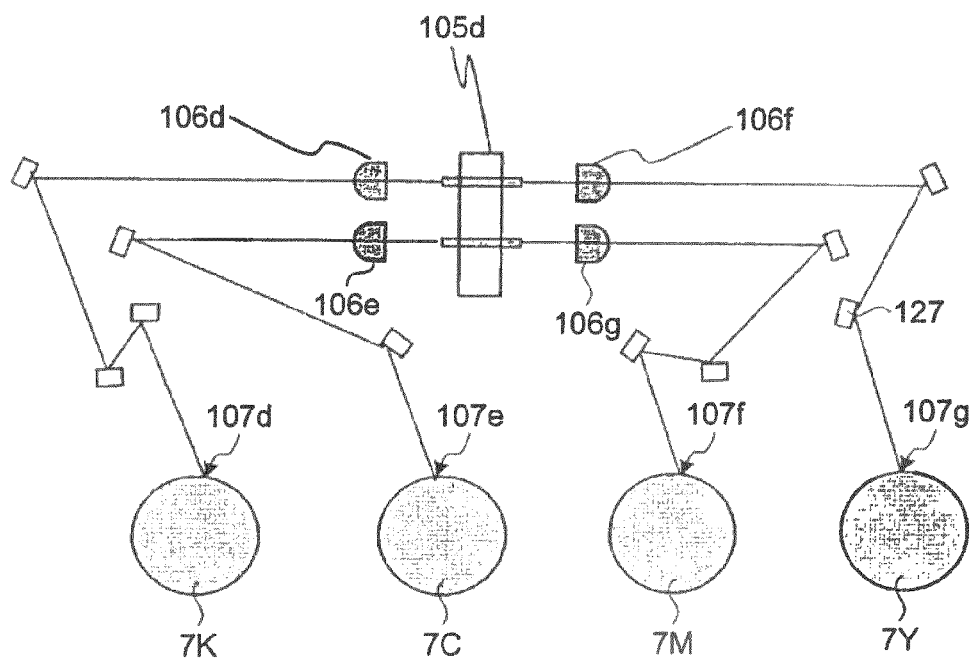
FIG. 21 is a schematic cross section of a tandem-type engine including an optical writing device according to a fourth embodiment of the present invention.
Figure 23A:
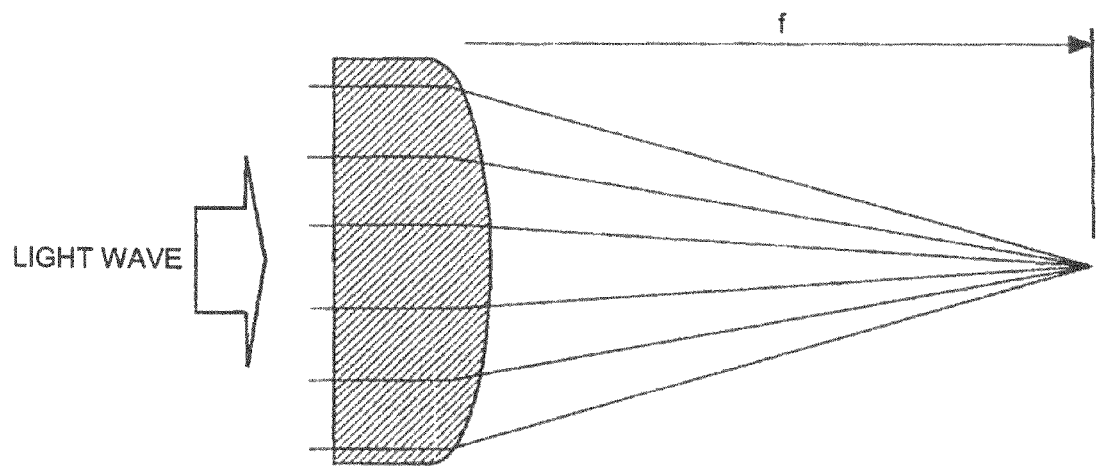
FIG. 23A is a cross section of a conventional spherical lens.
Figure 23B:
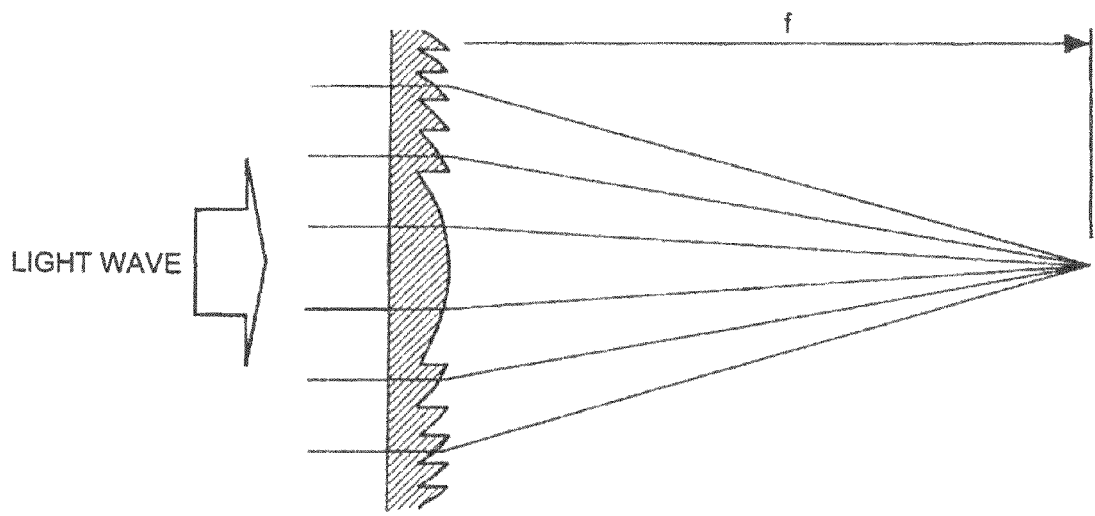
FIG. 23B is a cross section of a conventional lens having a diffractive surface.

An optical writing device according to the fourth embodiment using the optical scanning mechanism as explained above is shown in FIG. 21. FIG. 21 is a schematic cross section of a tandem-type engine using the optical writing device according to the fourth embodiment. The example of the optical writing device of FIG. 21 is configured in the following manner. Four laser beams are deflected and scanned by the polygon mirror 105d which is a shared optical deflector. Four scanning lenses 106d, 106e, 106f, and 106g arranged corresponding to the four laser beams cause respective laser beams to converge on and scan surfaces to be scanned 107d, 107e, 107f, and 107g of the four photosensitive elements 7K, 7C, 7M, and 7Y, respectively. And images are thereby written on the surfaces 107d, 107e, 107f, and 107g, respectively.

The polygon mirror 105d has deflection/reflection facets formed in two stages in the direction of the rotational axis, and the deflection/reflection facet in each stage laterally distributes laser beams emitted from two light sources so that the laser beams are deflectively reflected. The four scanning lenses 106*d*, 106*e*, 106*f*, and 106*g* in total are laterally arranged across the deflection/reflection facets in the two stages, and the four laser beams are arranged so as to transmit through the scanning lenses. In FIG. 21, reference numeral 127 represents ten mirrors in total for bending traveling directions of respective laser beams deflected and passing through the scanning lenses 106*d*, 106*e*, 106*f*, and 106*g*, and guiding the laser beams to corresponding surfaces 107*d*, 107*e*, 107*f*, and 107*g*, respectively.

An optical writing device according to the fifth embodiment using the optical scanning mechanism as explained above is shown in FIG. 22. FIG. 22 is a schematic cross section of a tandem-type engine using the optical writing device according to the fifth embodiment. The entire configuration of the optical writing device is as follows. The scanning lens is separated as first scanning/imaging lenses 106*h* and 106*i* and second scanning/imaging lenses 108*c*, 108*d*, 108*e*, and 108*f*. Each of the first scanning/imaging lenses is commonly used for two laser beams, and the first scanning/imaging lenses are located across a polygon mirror 105*e* as the optical deflector, in other words, one located on each side, so two pieces in total are located on both sides. The second scanning/imaging lenses are four, which are arranged corresponding to four laser beams.

In FIG. 22, reference numeral 128 represents ten mirrors in total for bending traveling directions of respective laser beams passing through the first scanning/imaging lenses 106*h* and 106*i* and further passing through the second scanning/imaging lenses 108*c*, 108*d*, 108*e*, and 108*f*, and guiding the laser beams to corresponding surfaces to be scanned 107*h*, 107*i*, 107*j*, and 107*k*, respectively.

Each of the optical writing devices shown in FIG. 21 and FIG. 22 uses any one of the optical scanning devices according to the first to the third embodiments, which enables effective removal of the diffracted light of an unnecessary diffraction order and the scattered light. Moreover, each of the optical writing devices is hardly affected by temperature variation or the like, and thus, high-precision optical writing can be stably performed.

As set forth hereinabove, according to the embodiments of the present invention, it is possible to effectively remove the diffracted light of an unnecessary diffraction order and the scattered light, to be hardly affected by temperature variation or the like, and to stably perform high-precision optical writing, thus forming excellent images.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
    a first optical system that shapes at least one light flux emitted from a light source unit and guides the at least one light flux to an optical deflector; and
    a second optical system that guides the at least one light flux deflected by the optical deflector to a surface to be scanned to form an image on the surface, wherein
    the first optical system has a diffractive surface, and
    the diffractive surface including a plurality of linear grooves of increasing depth from a periphery to a center of the diffractive surface.

2. The optical scanning device according to claim 1, wherein
    the diffractive surface includes a diffractive portion and a refractive portion, and
    the diffractive surface has any one of a shape that causes a power of the diffractive portion and a power of the refractive portion to cancel each other, and a shape of a multi-step structure.

3. The optical scanning device according to claim 1, wherein the diffractive surface has any one of a shape that maintains change in beam waist position caused by temperature variation in the light source unit substantially to zero in at least one of a main scanning direction and the sub-scanning direction, and a shape of a linear groove parallel to at least one of the main scanning direction and the sub-scanning direction.

4. The optical scanning device according to claim 1, wherein the light source unit includes any one of a plurality of semiconductor laser elements, a semiconductor laser element having a plurality of light emitting points, and a surface-emitting semiconductor laser element.

5. An image forming apparatus comprising:
    the optical scanning device according to claim 1.

6. An optical writing device comprising:
    the optical scanning device according to claim 1, wherein
    the first optical system and the second optical system share the optical deflector, and guides the light fluxes to a plurality of surfaces to be scanned to form images on the surfaces.

7. The optical scanning device according to claim 1, wherein the first optical system includes a linear-image forming lens made of resin, which has a function of focusing the at least one light flux in a sub-scanning direction, and
    the linear-image forming lens has a diffractive surface.

8. The optical scanning device according to claim 1, the at least one light flux emitted from the light source passes through the diffractive surface.

9. The optical scanning device according to claim 1, wherein the diffractive surface has no power.

* * * * *